(12) United States Patent
Luo et al.

(10) Patent No.: US 8,597,489 B2
(45) Date of Patent: Dec. 3, 2013

(54) METHOD, APPARATUS AND SYSTEM FOR FLEXIBLE ELECTROCHEMICAL PROCESSING

(75) Inventors: Yuefeng Luo, Mechanicville, NY (US); William Edward Adis, Scotia, NY (US); Laurence Scott Duclos, Unity, ME (US)

(73) Assignee: General Electric Company, Schenectady, NY (US)

( * ) Notice: Subject to any disclaimer, the term of this patent is extended or adjusted under 35 U.S.C. 154(b) by 497 days.

(21) Appl. No.: 12/832,693

(22) Filed: Jul. 8, 2010

(65) Prior Publication Data

US 2012/0006691 A1    Jan. 12, 2012

(51) Int. Cl.
*B23H 3/00*    (2006.01)
*B23H 7/00*    (2006.01)
*B23H 9/10*    (2006.01)

(52) U.S. Cl.
USPC ........... 205/660; 205/652; 205/653; 205/668; 205/670

(58) Field of Classification Search
USPC ......... 205/641, 645, 652, 653, 654, 660, 668, 205/672, 686
See application file for complete search history.

(56) References Cited

U.S. PATENT DOCUMENTS

| | | | |
|---|---|---|---|
| 2004/0163946 A1* | 8/2004 | Chang et al. | 204/224 M |
| 2006/0070887 A1 | 4/2006 | Zdeblick et al. | |
| 2007/0051618 A1 | 3/2007 | Luo | |
| 2007/0175751 A1* | 8/2007 | Batzinger et al. | 204/218 |
| 2009/0314653 A1 | 12/2009 | Kim et al. | |
| 2010/0038259 A1 | 2/2010 | Erdmann et al. | |
| 2010/0051475 A1 | 3/2010 | Eto et al. | |
| 2010/0051476 A1 | 3/2010 | Matsuo et al. | |

FOREIGN PATENT DOCUMENTS

SU            921749 A1 *    4/1982    ............... B23P 1/12

OTHER PUBLICATIONS

Oxford Advanced American Dictionary, definition of "strip," Oxford University Press.*
Medvedev, B.A., Human Translation of "Tool Electrode for Dimensional Electrochemical Machining of Curved Surfaces," SU 921749 A1, Apr. 26, 1982.*

* cited by examiner

*Primary Examiner* — Luan Van
*Assistant Examiner* — Ho-Sung Chung
(74) *Attorney, Agent, or Firm* — Nixon & Vanderhye, P.C.

(57) ABSTRACT

Conventional electrochemical machining process requires fixed shaped tool cathodes, which makes retooling time consuming and expensive. Flexible tool cathodes include elastically deformable cathodes that can deform in two or three dimensions and can adapt to the contour of the workpiece while the workpiece is moving relative to the flexible tool cathode. That is, the flexible tool cathode can perform tracing. Certain flexible tool cathodes can be also used for special configurations such corners and edges. The flexible tool cathodes can be used to polish, finish, or shape the workpiece through electrochemical processes.

41 Claims, 15 Drawing Sheets

METHOD, APPARATUS AND SYSTEM FOR FLEXIBLE ELECTROCHEMICAL PROCESSING

RELATED APPLICATION

The subject matter of the present disclosure may be related to U.S. applications Ser. Nos. 12/567,829 and 12/567,835 both entitled "SYSTEMS AND APPARATUS RELATING TO ELECTROCHEMICAL MACHINING" and filed on Sep. 28, 2009, which are hereby incorporated in their entirety by reference.

One or more aspects of the present invention relate to method, apparatus and system for flexible electrochemical processing.

BACKGROUND OF THE INVENTION

Traditionally, machining methods such as turning, grinding, drilling, and milling involve application of mechanical forces. In these methods, a hard tool is used to machine the workpiece, and thus, the tool needs to be harder than the workpiece. However, in some applications, it is desirable that the workpiece itself be made of hard materials. For example, blades of turbine engines have stringent requirements including hardness since they are subjected to harsh operating environments. When the workpiece itself is hard, conventional mechanical machining is typically not feasible.

Electrochemical machining (ECM) is commonly used as an alternative method of machining hard workpieces. In ECM, an electrically conductive hard workpiece is machined with a tool, which is also electrically conductive. During ECM, the tool acting as a cathode is located relative to the workpiece acting as the anode, such that a gap is defined therebetween, and the gap is filled with flowing electrolyte such as sodium nitrate aqueous solution. A high density direct current with low voltage is applied between the cathodic tool and the anodic workpiece to cause electrolytic dissolution of the workpiece. The dissolution action takes place in an electrolytic cell formed by the cathodic tool and the anodic workpiece separated by the flowing electrolyte. The eroded material or sludge, a form of metal hydroxide, is removed from the gap with the flowing electrolyte. The anodic workpiece generally assumes a contour that matches the contour of the cathodic tool. The sludge can be filtered from the electrolyte and the clean electrolyte can be reused.

In ECM, the tool does not wear. Also, the rate of machining is independent of the hardness of the workpiece. Thus, soft metals such as copper and brass may be used as the tool to shape workpieces of hard or tough metals such as carbon steel, inconel, titanium, hastelloy, and kovar or alloys thereof, and the tool cathode may be used repeatedly. This is advantageous since shapes, even complex ones, can be formed on soft metals with relative ease and used to shape workpieces of hard metals and alloys.

ECM does have its drawbacks. Specialized tool must be constructed for each desired shape in the conventional ECM. In an industry like power generation, even a small gain in efficiency such as one percent represents significant operation cost savings. Thus, turbine manufacturers are constantly redesigning turbine blades and other turbine parts to achieve incremental efficiency gains. Using the conventional ECM in such a circumstance requires regularly producing new tools, which can be very expensive. Thus, it would be desirable to provide electrochemical processing methods, apparatuses, and systems that can flexibly adapt to workpieces of different shapes to reduce costs and time associated with the conventional ECM.

BRIEF SUMMARY OF THE INVENTION

A non-limiting aspect of the present invention relates to a flexible electrochemical tool to perform a flexible electrochemical process on a workpiece. The flexible electrochemical tool may comprise a strip sheet metal elastically deformable in two dimensions (2D), a machine ram, and a plurality of support connectors connected with the machine ram at upper ends thereof and connected with the strip cathode at lower ends thereof along a length of the strip cathode. The plurality of support connectors may include at least one fixed support connector whose lateral position is fixed relative to the machine ram. Each support connector may be arranged to vary in stroke as the strip cathode elastically deforms. Also, each support connector may include a rotating coupler arranged to couple the lower end of the support connector and arranged to turn as the strip cathode elastically deforms.

Another non-limiting aspect of the present invention relates to a method to perform a flexible electrochemical process on a workpiece. In the method, a flexible electrochemical tool may be positioned such that a flexible cathode of the flexible electrochemical tool cathode engages a surface part of the workpiece submerged in a work tank filled with electrolyte. After the workpiece has been engaged, power and electrolyte flow may be initiated to start the electrochemical machining process. Then the flexible cathode may be traced toward a first or second end of the workpiece. Tracing may involve maintaining the power and the electrolyte flow while the flexible cathode is being moved relative to the workpiece.

Another non-limiting aspect of the present invention relates to a system to perform a flexible electrochemical process on a workpiece. The system may comprise a work tank, a flexible electrochemical tool with a flexible cathode, a machine ram, a plurality of clampings, and a controller. The work tank may be filled with electrolyte. The flexible cathode may be capable of continually adapting to a surface contour of a workpiece. The machine ram may be arranged to move the tool cathode. The plurality of clampings may be arranged to secure the workpiece within the work tank. The controller may be arranged to position the tool cathode such that the tool cathode engages a surface part of the workpiece submerged in work tank filled with electrolyte. Or the tool cathode contains electrolyte channels to supply the electrolyte to the electrolytic cell without submerging the workpiece. The controller may also be arranged to initiate power and electrolyte flow after the workpiece has been engaged to start the flexible electrochemical process. The controller may further be arranged to trace the tool cathode toward a first or a second end of the workpiece. Tracing may involve maintaining the power and the electrolyte flow while the tool cathode is being moved relative to the workpiece.

Another non-limiting aspect of the present invention relates to a cornering flexible electrochemical tool to perform a flexible electrochemical process on a workpiece. The cornering flexible electrochemical tool may comprise a cathode, a machine ram, and an elastomer in between the cathode and the machine ram to provide an adaptive backing so that the cathode adapts to a shape of a corner of the workpiece. The corner of the workpiece may be formed by two side surfaces that extend substantially in straight directions from a corner point forming a concave surface with a corner angle θ. The cathode may be pre-bent at an angle α for corner angles that is greater than θ. The difference provides the necessary compression of the cornering tool cathode to workpiece corner.

Another non-limiting aspect of the present invention relates to an edging flexible electrochemical tool to perform a flexible electrochemical process on a workpiece. The edging flexible electrochemical tool cathode may comprise a strip cathode, a machine ram, and an elastomer in between the cathode and the machine ram to provide an adaptive backing so that the cathode adapts to a shape of an edge of the workpiece. An edge of the workpiece may be formed by two side surfaces that extend substantially in straight directions from an edge point 1060 forming a convex surface with an edge angle φ. The strip cathode may be pre-bent at an angle β for edge angles that is less than φ. The difference provides necessary compression of the edge cathode to the workpiece edge.

Another non-limiting aspect of the present invention relates to a flexible electrochemical tool to perform a flexible electrochemical process on a workpiece. The flexible electrochemical tool may comprise a sheet cathode, a machine ram, and a plurality of support connectors. The sheet cathode may be arranged to elastically deform in three dimensions (3D). The plurality of support connectors may be connected with the machine ram at upper ends thereof and connected with the sheet cathode at lower ends thereof along an upper surface of the sheet cathode. Each support connector may be arranged to vary in stroke as the sheet cathode elastically deforms. Each support connector may also include a lower coupler arranged to couple the lower end of the support connector with the flexible sheet cathode as the sheet cathode elastically deforms.

Another non-limiting aspect of the present invention relates to a flexible electrochemical tool to perform a flexible electrochemical process on a workpiece. The flexible electrochemical tool may comprise a sheet cathode, a machine ram, an elastomeric backing and at least one sensor. The sheet cathode may elastically deform in 3D. The machine ram may be arranged to move the flexible electrochemical tool and to apply a compression force. The elastomeric backing may be arranged to provide an elastic backing to the sheet cathode. The sensor may be arranged to measure a surface height of a workpiece when the flexible electrochemical tool is engaged with a workpiece. The sheet cathode may continually adapt to a contour of the workpiece when the tool cathode is moved while being engaged with the workpiece.

Another non-limiting aspect of the present invention relates to a method to perform a flexible electrochemical finishing process. In the method, a flexible electrochemical tool may be positioned such that a flexible cathode of the flexible electrochemical tool engages a surface part of a workpiece submerged in a work tank filled with electrolyte or sprayed with electrolyte from the tool cathode. After the workpiece has been engaged, power and electrolyte flow may be initiated to start the flexible electrochemical finishing process. The workpiece may be flexible electrochemical finished as the flexible electrochemical tool is moved toward a first or a second end of the workpiece. The flexible electrochemical finishing process may comprise finishing the workpiece so as to correct surface errors of the workpiece, surface errors being defined as deviations in a surface height of a surface part that it outside a predetermined tolerance limit for the surface part. The flexible electrochemical finishing process may be performed while the tool cathode is engaged with the workpiece and moving relative to the workpiece.

Another non-limiting aspect of the present invention relates to a system to perform a flexible electrochemical finishing process on a workpiece. The system may comprise a work tank, a flexible electrochemical tool including a flexible cathode, a machine ram, a plurality of clampings, and a controller. The work tank may be filled with electrolyte or the workpiece is sprayed with electrolyte from the tool cathode. The flexible electrochemical tool may include a strip cathode, and the flexible electrochemical tool may be capable of continually adapting to a surface contour of a workpiece. The machine ram may be arranged to move the flexible electrochemical tool. The plurality of clampings may be arranged to secure the workpiece within the work tank. The controller may be arranged to position the flexible electrochemical tool such that the flexible cathode engages a surface part of the workpiece submerged in work tank filled with electrolyte or sprayed with electrolyte from the flexible electrochemical tool. The controller may also be arranged to initiate power and electrolyte flow after the workpiece has been engaged to start the a flexible electrochemical finishing process. The controller may further be arranged to finish a first or a second end of the workpiece. The a flexible electrochemical finishing process may comprise finishing the workpiece so as to correct surface errors of the workpiece, surface errors being defined as deviations in a surface height of a surface part that it outside a predetermined tolerance limit for the surface part. The workpiece may be flexible electrochemical finished while the flexible electrochemical tool is engaged with the workpiece and moving relative to the workpiece.

The invention will now be described in greater detail in connection with the drawings identified below.

BRIEF DESCRIPTION OF THE DRAWINGS

These and other features of the present invention will be better understood through the following detailed description of example embodiments in conjunction with the accompanying drawings, in which.

DETAILED DESCRIPTION OF THE INVENTION

As described herein, flexible electrochemical processes in accordance with embodiments of the present application may provide a relatively high speed way to finish, polish, and/or shape workpieces. In one or more non-limiting aspects, flexible electrochemical tools are provided which can adapt to the general contours of the different workpieces.

Figure 1:
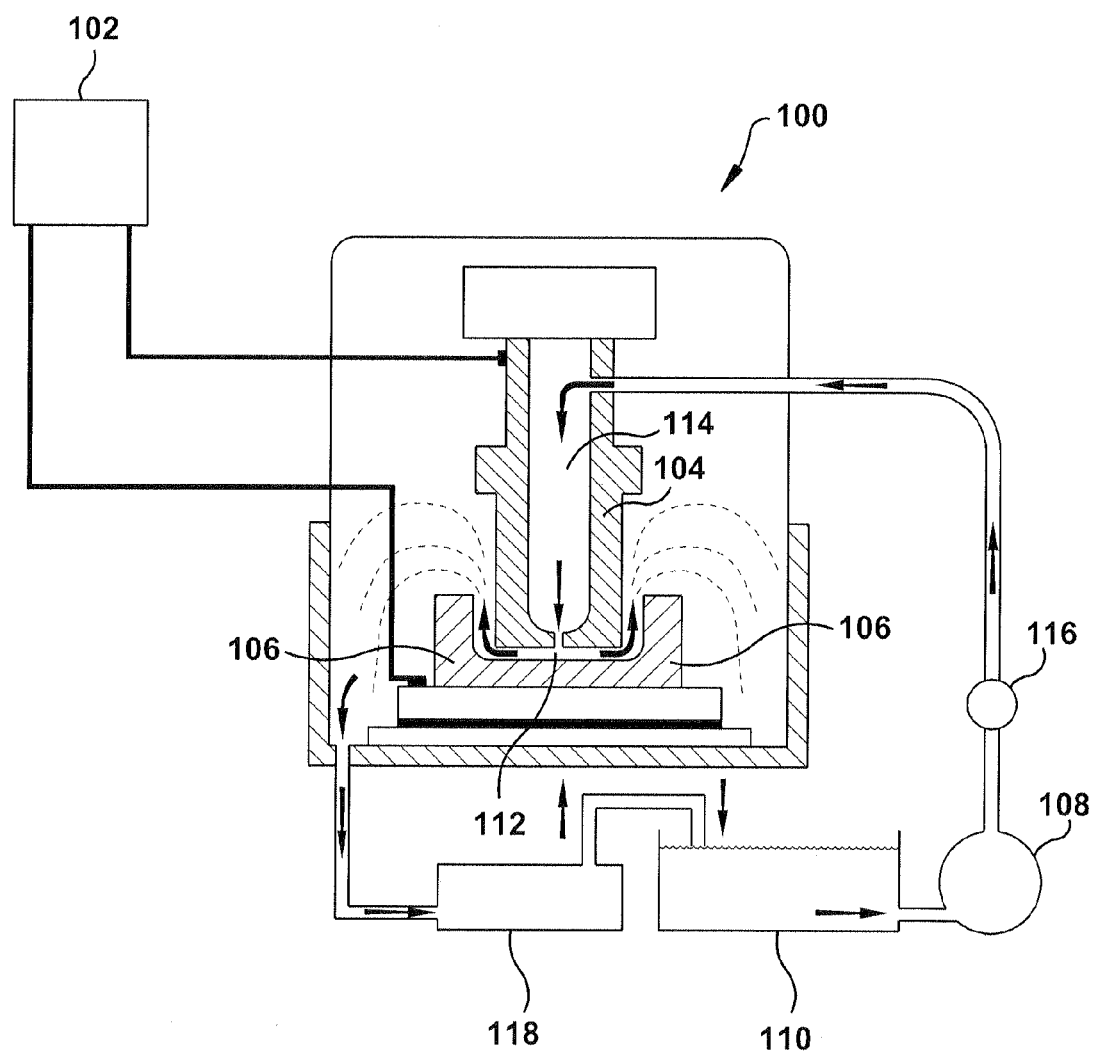
FIG. 1 illustrates a conventional electrochemical machining system.

In FIG. 1, a conventional ECM system is illustrated. The ECM system 100 includes a power supply 102, a tool 104 and a workpiece 106 respectively acting as a cathode and an anode of an electrolytic cell, an electrolyte pump 108, and an electrolyte tank 110. The shape of the tool 104 is fixed. In operation, the tool 104 and the workpiece 106 are positioned such that a relatively narrow inter-electrode gap 112 is defined by the space therebetween. The power supply 102 is used to apply a voltage across the workpiece 106 and the tool 104.

The system 100 includes an electrolyte system to pump a continuous stream of pressurized electrolyte into the gap 112 in which the electrolyte is pumped from an electrolyte tank 110 by the pump 108 and delivered to hollow electrolyte channels 114 formed within the tool 104. The channels 114 direct the electrolyte toward the workpiece 106. From the channel 114, the electrolyte exits the tool cathode 104 and flows through the gap 112 at a relatively high rate and pressure.

The workpiece 106 is shaped by metal removal of the workpiece metal by electrochemical dissolution of the anodically polarized workpiece 106. During the ECM operation, the electrolyte moving through the gap 112 removes the electrochemical dissolution material from the workpiece 106 diminishing the shape error of workpiece 106. The metal removal rate is generally inversely proportional to the separation between the cathode and the anode. As the tool 104 is moved closer to the workpiece 106, the separation, i.e., the gap 112, between the cathodic tool 104 and the anodic workpiece 106 along the lengths of the tool 104 and the workpiece 106, the gap tends to a steady-state value, and the workpiece 106 generally takes on the contour of the tool cathode 104.

As noted, the tool 104 is uniquely shaped to fabricate the corresponding workpiece 106 in the conventional ECM. Fabricating many tool 104, each with its unique shape and with necessary electrolyte channels 114 configured therein, can be costly. When a tool 104 is used to fabricate relatively small number of corresponding workpieces 106, the cost issue can become exaggerated.

Figure 2:
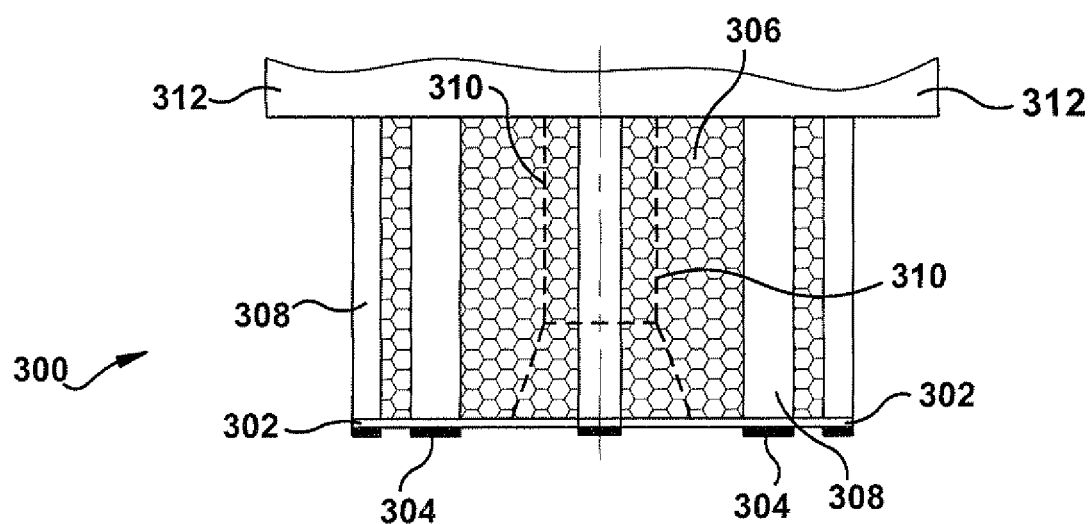
FIG. 2 illustrates an example of a tool cathode of the related application.

In the above-mentioned related application, a cathode tool is described which provides a significant level of interchangeability. FIG. 2 illustrates an example of a related tool 300 that can be used on variety of workpiece shapes due to its flexibility, which is unlike the conventional tool. The tool 300 illustrated in FIG. 2 includes a cathode 302, spacer pads 304, an elastomeric backing 306, conducting strips 308, and an electrolyte channel 310. A machine ram 312 can move or position the tool cathode 300 so as to engage a workpiece in a desired manner.

Figure 3:
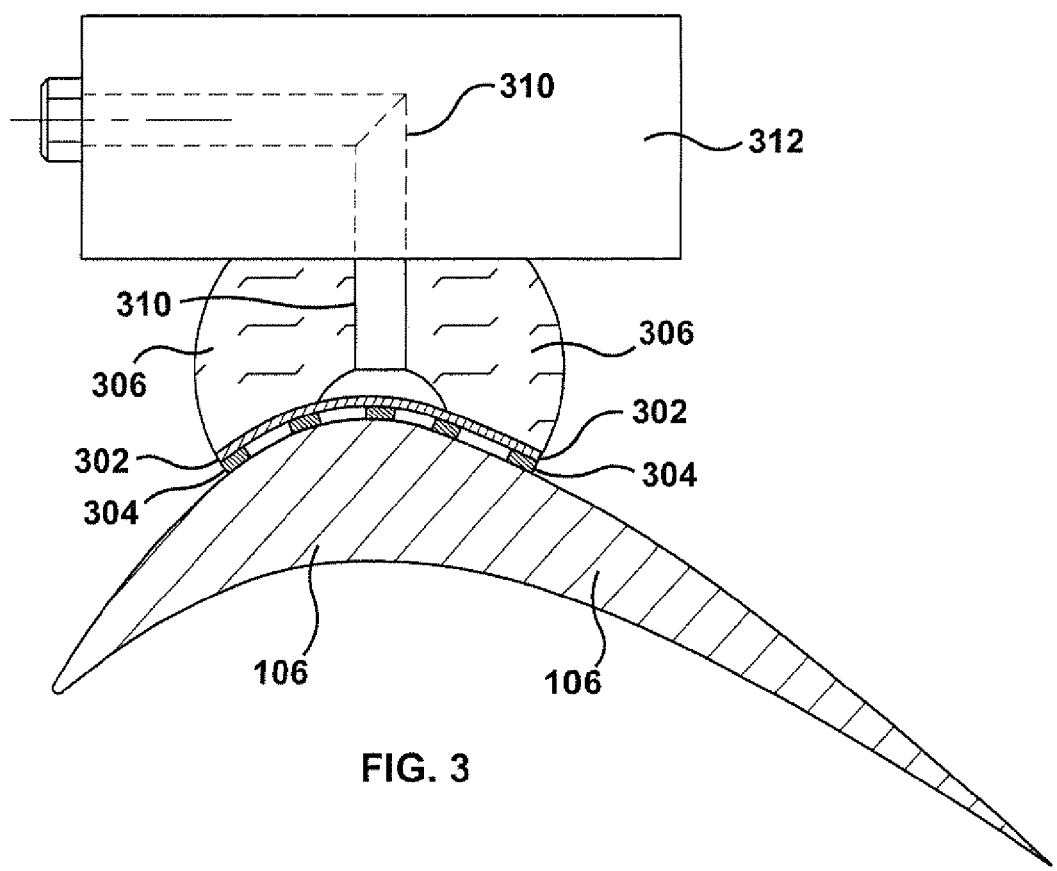
FIG. 3 illustrates the tool cathode of the related application being applied to a workpiece.

The cathode 302 is a relatively thin and flexible, electrically conducting material. As illustrated in FIG. 3, the elastomeric backing 306 provides shape compliance to allow the cathode 302 to deform, and thus conform to the surface contour of the workpiece 106. The elastic deformation is such that the outer surface of the cathode 302 is at a desired distance from the surface of the workpiece 106 allowing efficient ECM processes to be carried out. In this way, the related tool 300 allows a general three-dimensional surface to be polished without requiring numerous cathode dies.

When the workpiece 106 has a larger surface area than the tool 300, the tool 300 is applied to different parts of the workpiece 106 one part at a time. For example, the tool 300, and more specifically the cathode 302 compresses down to embrace a surface part of the workpiece 106. After the surface part is embraced, the electrolyte and power are turned on to polish the engaged surface part underneath the cathode 302. After the surface part is polished, the tool 300 is lifted and shifted to embrace a new surface part, and the new surface part is polished. This cycle of intermittent polishing continues until the entire surface of the workpiece is polished.

Figure 4A:
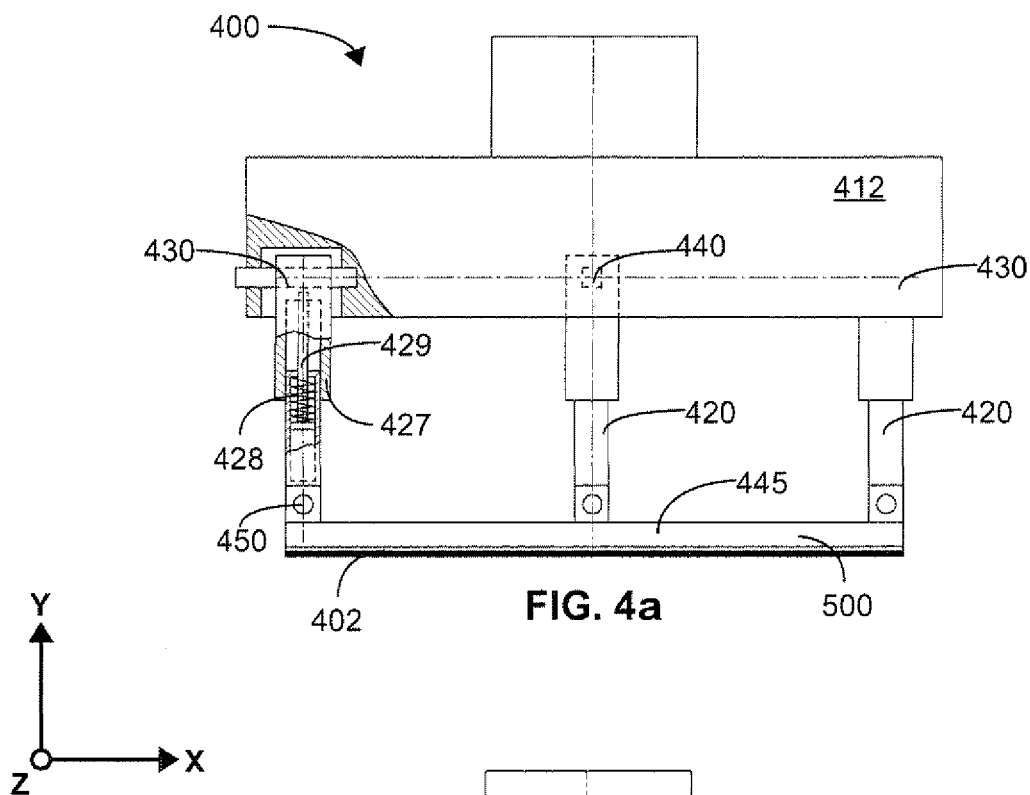
FIGS. 4*a* and 4*b* illustrate a 2D flexible electrochemical tool according to an embodiment of the present invention in compressed and uncompressed states.
Figure 4B:
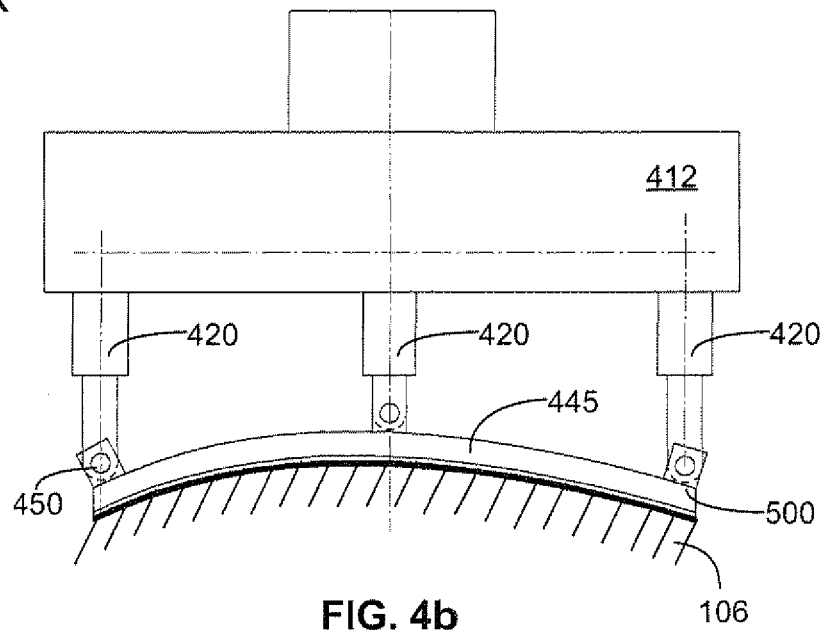

FIGS. 4a and 4b illustrate a two-dimension (2D) flexible electrochemical tool (FEC tool) 400 which can be used to perform a flexible electrochemical process (FEC process) according to an embodiment of the present invention. For ease of reference, directions X, Y and Z are indicated in these figures. "X" refers to side-to-side or lateral direction; "Y" refers to up-down or vertical direction; and "Z" refers to in-out direction. It should be appreciated that when components or embodiments are described as being in a particular position or moving in a particular direction, they are for descriptive purposes and are not meant to be limiting. For example, when a component such as a FEC tool is described as moving vertically, it does not necessarily mean that in the actual implementation, the component must move in the direction of gravity.

One of several motivations behind the present invention is to enable the workpiece to be traced. As used in this document, tracing refers to a capability to perform a flexible electrochemical process while the workpiece and the FEC tool are in motion relative to each other. As an example, a workpiece can be polished by tracing. It should be appreciated that compared to the intermittent polishing process described above with the related application, the continuous polishing process should be faster. Tracing also has other desirable qualities as will be shown throughout this document.

The phrase "flexible electrochemical process" (also FEC process) is introduced in the above paragraph. The FEC process broadly encompasses processes such as polishing, finishing, and shaping among others. The FEC processes should be distinguished from the conventional ECM process in which a fixed cathode die is used to remove chunks of metal from the workpieces. The FEC processes described in this document, unless otherwise specifically stated, generally refer to the removal of layer or layers of metal from the workpiece metal surface using the flexible electrochemical tools.

It should also be appreciated that the workpiece and the FEC tool can be moved relative to each other by moving one, the other, or both. Thus, unless explicitly indicated otherwise, statements such as "A moved relative to B" should be taken to be equivalent to statements such as "B moved relative to A", and "A and B moved relative to each other", and thus should be taken to encompass all possibilities of relative movement. Also statements such as "A moved towards/away from B" and "A and B moved towards/away from each other" should also be taken to indicate relative movements.

To facilitate smooth tracing motion, some amount of lateral rigidity is desirable. Lateral rigidity provides a more stable lateral motion on curved part surfaces. The FEC tool embodiment illustrated in FIGS. 4a and 4b provides such lateral rigidity and vertical flexibility. FIG. 4a illustrates an uncompressed state of the FEC tool 400 and FIG. 4b illustrates a compressed state. The FEC tool 400 can include a strip cathode 402, a machine ram 412, and a plurality of support connectors 420. As will be explained further below, the plurality of support connectors 420 can comprise at least one fixed support connector and at least one non-fixed support connector. The machine ram 412 can be connected with the support connectors 420 at the upper ends of the support connectors 420. The lower ends of the support connectors 420 can connect with the strip cathode 402 along a length of the strip cathode 402.

The strip cathode 402 is preferably elastically deformable, i.e., flexible, in 2D. The explanation is as follows. In FIG. 4a, the strip cathode 402 in the uncompressed state is positioned lengthwise in the lateral direction. That is, the strip cathode 402 is linear in the X or lateral direction in the uncompressed state. In the compressed stated as seen in FIG. 4b, the strip cathode 402 elastically deforms or flexes in the Y or vertical direction at different points along its length in the lateral direction, and the amount of deformation in the Y direction can be different along different X positions as the strip cathode 402 conforms to the surface contour of the workpiece 106.

An analogy is that of a windshield wiper conforming to a curvature of a car windshield as the wiper and the windshield are moved relative to each other. One of several advantages of the FEC tool 400 is that the strip cathode 402 can bend more easily for a 2D curved line. Also, the strip cathode 402 can spring back easily when the workpiece 106 surface changes shape. Note that the support connectors 420 can be oriented in the Y direction, normal to the X direction, when the sheet cathode 402 is in the uncompressed state.

When the FEC tool 400 is under compression as shown in FIG. 4b, it is seen that vertical lengths of the different support connectors 420 are different, i.e., their strokes are different to adjust to the curvature of the workpiece 106. Thus, the support connectors 420 can vary their strokes as the strip cathode 402 elastically deforms in 2D. But regardless of the strokes, it is preferred that the support connectors 420 apply a uniform pressure. This provides vertical flexibility so that the strip cathode 402 can adapt to the curved surface of the workpiece 106. As seen in FIG. 4b, note that as the strip cathode 402 elastically deforms, the stroke of the support connectors 420 vary so as to change the length of the support connectors 420.

In one embodiment, the support connectors 420 are air cylinders, and each cylinder 420 may include a vertical sliding bearing 427 and a spring 428. The bearing 427 and spring 428 enable the cylinder 420 to provide elastic support so that the flexible strip cathode 402 can conform to the surface contour of the workpiece 106.

The air cylinder 420 can further include a piston 429 which can be moved in the vertical direction by any well known drive mechanism, and the air pressure within the cylinder 420 can be accurately controlled through, for example, controllers (not shown in FIGS. 4a and 4b). Using the constant air pressure and drive mechanisms, the stroke of each cylinder 420 can be set according to the contour of the workpiece 106, which in turn allows the deformation of the strip cathode 402 to be controlled. As will be demonstrated further below, the ability to shape the strip cathode 402 provides an advantageous capability to finish the workpieces 106. The drive mechanism can be incorporated in the machine ram 412. The cylinder 420, through the drive mechanism, may vary its stroke based on the workpiece contour so as to elastically deform the strip cathode 402 and to embrace the workpiece surface.

As mentioned, it is preferred that the pressure exerted by the plurality of cylinders 420, i.e., the plurality of support connectors 420, be substantially equal. That is, the support connectors 420 can have variable stroke and substantially constant pressure, which the constant air pressure in the cylinder ensures. Alternatively, hydraulic or electromagnetic mechanisms among others may be used as support connectors 420.

Each support connector 420 can include a rotating coupler 450 that couples the lower end of the corresponding support connector 420 with the strip cathode 402. An example of a rotating coupler 450 is a journal bearing. As seen in FIG. 4b, the journal bearings 450 turn to couple the vertically extending support connectors 420 with the curved strip cathode 402 with its elastomeric backing strip 445.

As the strip cathode 402 is elastically deformed in 2D, it is shortened in the lateral direction. Sliding couplers 430 above outer support connectors 420 allow the cylinder translation 460 to link the vertically extending support connectors 420 with the curved and thus, laterally shortened strip cathode 402. The support connectors 420 connected to the sliding couplers 430 are referred to as non-fixed support connectors since they are allowed to slide in the lateral direction, preferably within some limits, relative to the machine ram 412.

On the other hand, it may be preferred that there be at least one fixed support connector 420 whose lateral position is fixed relative to the machine ram 412. In FIGS. 4a and 4b, the center support connector 420 is shown to have its lateral position fixed through a fixed connection 440 to the machine 412. This is merely an example and not a limitation. Any of the support connectors 420 including the non-center support connectors may be fixed.

The rotating couplers 450 and sliding couplers 430 allow the non-fixed support connectors to extend or contract substantially vertically straight from the machine ram 412 and be linked with the curved and laterally shortened strip cathode 402. The fixed support connector extends or contracts as the strip cathode 402 deforms substantially vertically straight from the mounting machine ram 412 due to its fixed connection. The rotating couplers 450 allow the both fixed and non-fixed support connectors 420 to adapt substantially normally to the workpiece surface contour as seen FIG. 4b.

It is assumed that during the flexible EC process operation, the FEC tool 400 is moved in the Z direction—in and out of the paper in FIGS. 4a and 4b—relative to the workpiece 106. The FEC tool 400 can trace the surface of the workpiece 106 along the Z direction. As the FEC tool 400 is driven in the Z direction, all support connectors 420, both fixed and non-fixed, can take varying strokes to provide lateral rigidity for the driving force as well as vertical freedom for cathode flexibility. For clarity, electrolyte and power connections are not shown.

Figure 5:
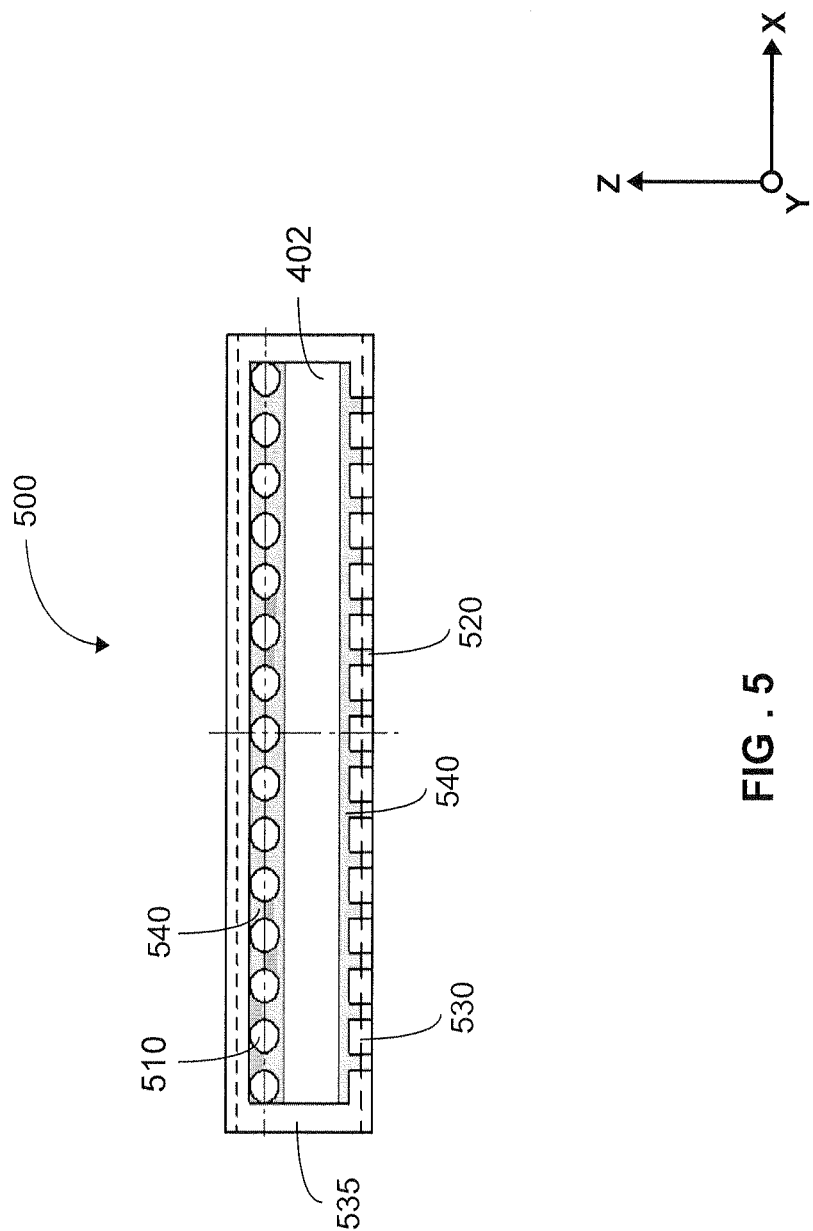
FIG. 5 illustrates a structure of a flexible strip cathode according to an embodiment of the present invention.

FIG. 5 illustrates an example flexible cathode structure that includes the strip cathode 402 as viewed from the bottom. Note that in FIG. 5, since the view is from the bottom, the Y direction is now in and out of the paper as indicated. Preferably, the strip cathode 402 is flat, relatively long and thin. The relative dimensions are not necessarily to scale. The structure 500 is preferably much longer than it is wide so that in practice, the cathode 402 can considered to be a strip, i.e., a line cathode. The cathode 402 can be formed from a flexible sheet metal with rubber strip backing.

The structure 500 can also include a plurality of inlets 510 to supply the electrolyte and a plurality of outlets 520 to allow the electrolyte to flow out. Spaces between a plurality of insulation spacers 530 define the outlets 520 in this embodiment. The structure 500 also includes one or more insulating standoffs 535. The standoffs 535 and spacers 530 guide the electrolyte from the inlets 510 to the outlets 520 and prevent electrolyte leaks and escapes to the sides and the back. The insulating standoffs 535 and the insulation spacers 530 are all preferably at a predetermined thickness (into and out of page) so as to provide a well-defined inter-electrode gap between the cathode 402 and the workpiece 106 (not shown in FIG. 5).

Preferably, insulating coating 540 is applied to areas where the electrolyte flow is not stable. Unstable electrolyte flow can cause undesirable surface roughening. These areas usually include electrolyte inlets 510 and outlets 520. Thus, as shown in FIG. 5, insulating coatings 540 are applied in the area corresponding to the inlets 510, and 520, and the center of the structure 500 is exposed where the electrolyte is relatively stable.

Figure 6:
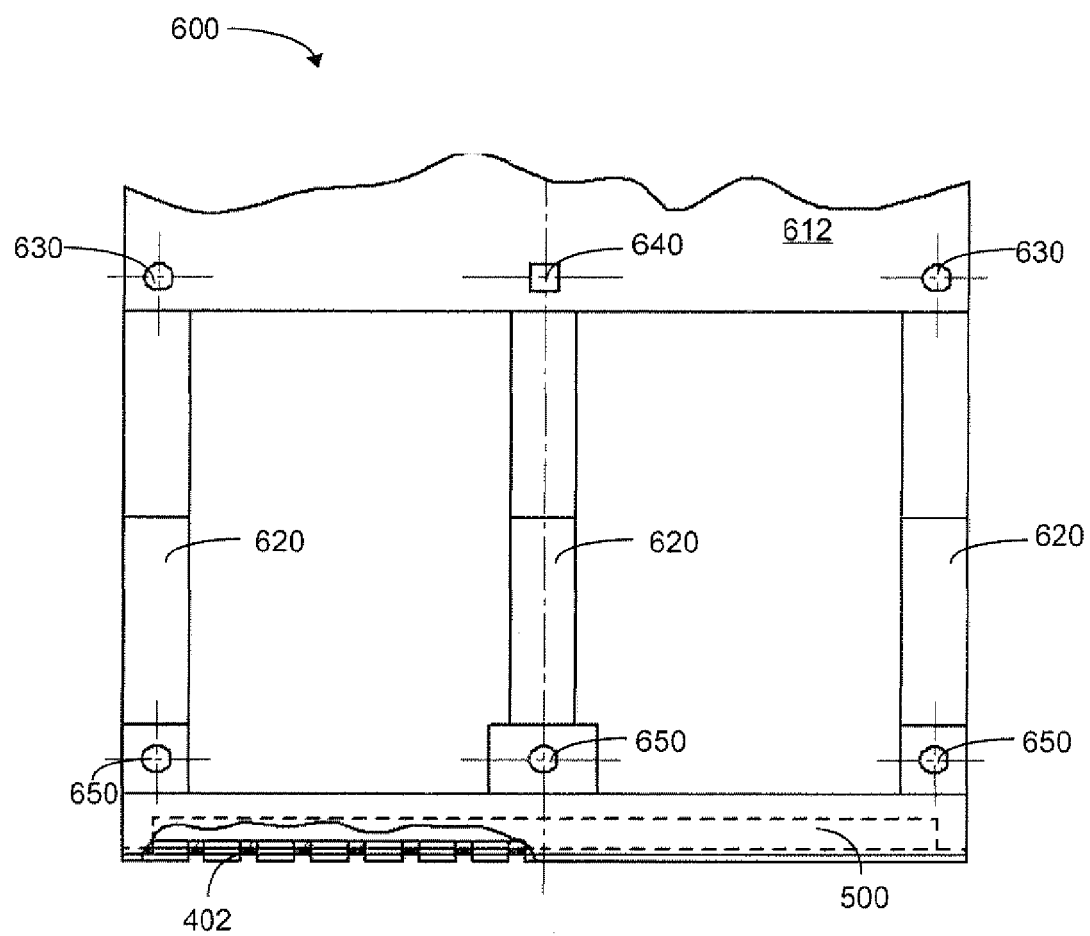
FIG. 6 illustrates a 2D flexible electrochemical tool according to another embodiment of the present invention.

FIG. 6 illustrates a flexible 2D FEC tool 600 according to another embodiment of the present invention. The FEC tool 600 can include many similar components as the FEC tool 400 such as the strip cathode structure 500 and the machine ram 612. The FEC tool 600 can also include the plurality of support connectors 620 which comprises at least one fixed support connector (connected to fixed connector 640) and at least one non-fixed connector (connected to rotating couplers 630). The support connectors 620 can be coupled to the cathode structure 500 at the lower ends thereof through rotating couplers 650, for example, journal bearings. Further, the support connectors 620 can vary their strokes and also apply a uniform pressure while varying the strokes.

However, instead of the sliding couplers, rotating couplers 630 can couple the non-fixed support connectors 620 at the upper ends thereof. For ease of reference, rotating couplers 650 and 630 are respectively referred to as the lower and upper rotating couplers. The upper rotating couplers 630 allow the outer non-fixed support connectors to rotate to accommodate the laterally shortened strip cathode 402 as it elastically deforms. The non-fixed support connectors may not necessarily extend or contract vertically straight from the machine ram 612. The lower rotating couplers 650 allow the both fixed and non-fixed support connectors to adapt substantially normally to the workpiece surface contour.

Operation wise, both FEC tools 400 and 600 are excellent to perform a continuous EC process such as the continuous EC polishing process. While the FEC tool 400, 600 is moved to trace the surface of the workpiece 106, the FEC tool 400, 600 continually adapts to the surface contour of the workpiece 106 to carry out the EC polishing process.

Figure 7:
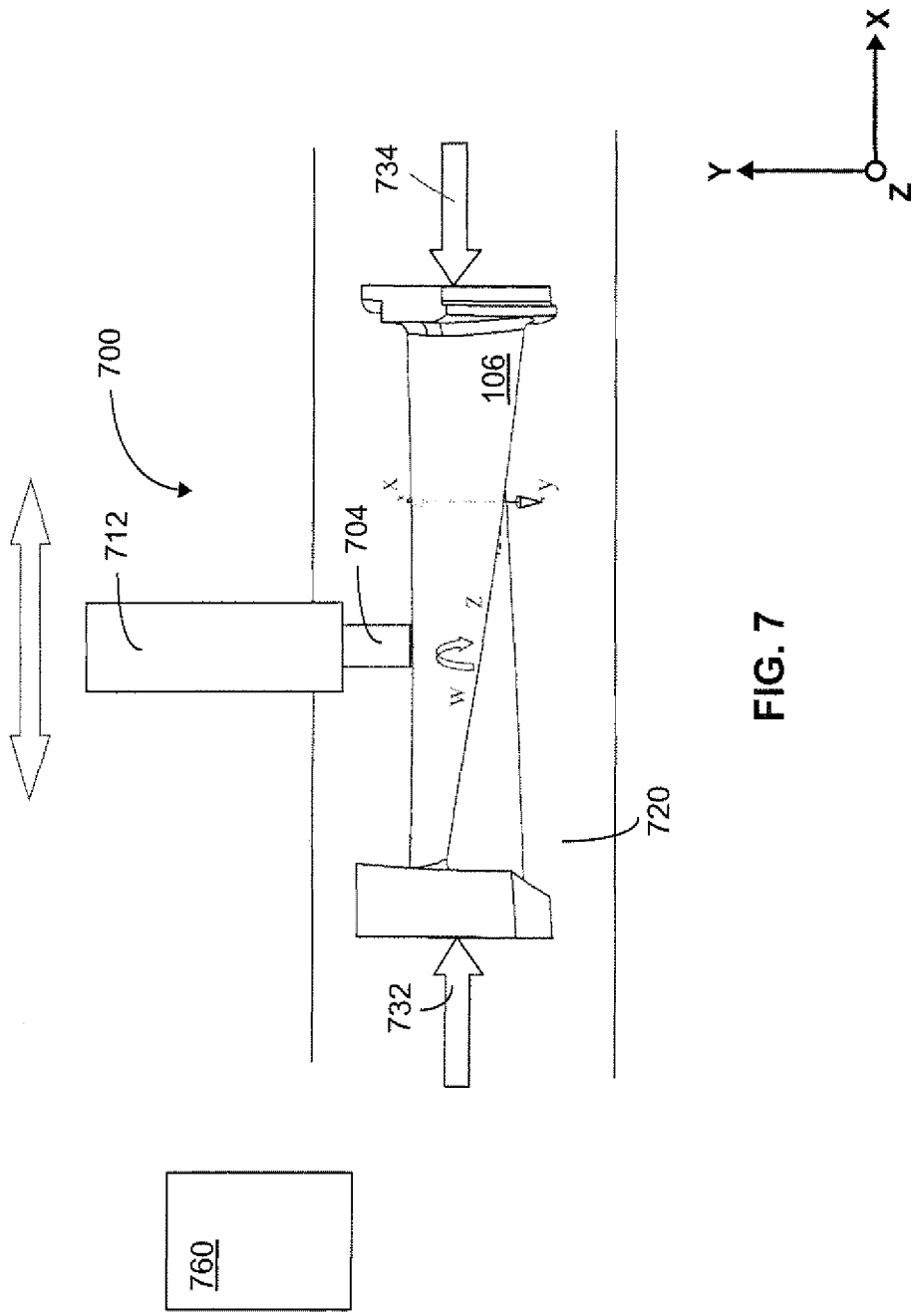
FIG. 7 illustrates system to perform a flexible electrochemical process according to an embodiment of the present invention.

FIG. 7 illustrates system to perform a flexible EC process such as polishing, finishing and/or shaping according to an embodiment of the present invention. The system 700 may be described as an example of an electrolyte system in which the electrolyte may fill a work tank 720 such that the workpiece 106 such as a steam turbine bucket and a FEC tool 704 are submerged during the EC process. Alternatively without submerging the FEC tool 704 and workpiece 106, the electrolyte can be supplied through fluid conduits to the cathode inlets and out from cathode outlets of the FEC tool 704. The FEC tool 704 can be connected to a machine ram 712. The workpiece 106 may be supported in the work tank 720 by left and right clampings 732, 734. A controller 760 may control the system's operation automatically or under manual instructions from an operator. The controller 760 may be implemented through various combinations of hardware, software, and firmware components such as a computer, storage devices, communication units, and numerical control programs.

For sake of clarity, components such as the electrolyte reservoir, electrolyte pump, electrolyte filter, power supply, controllers, drive mechanism, pipes, hoses, and fittings are not shown. Also connections between the controller 760 and other components are not shown so as to reduce obscuring the information.

Figure 8:
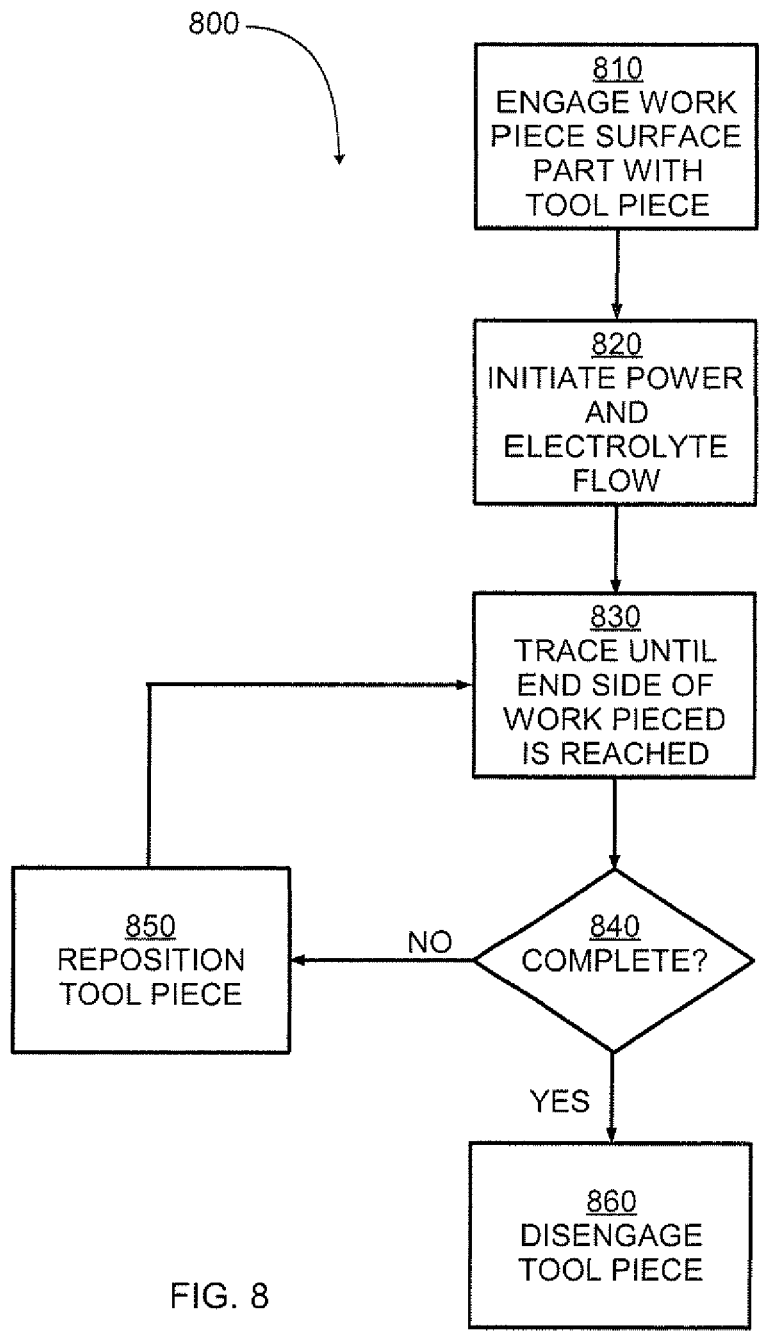
FIG. 8 illustrates a flow chart of a method to perform a flexible electrochemical polishing process according to an aspect of the present invention.

FIG. 8 illustrates a flow chart of an example method to perform a flexible EC polishing process according to an aspect of the present invention. In the method 800, the controller 760 may position the FEC tool 704 to engage a surface part of the workpiece 106 in step 810. For example, the FEC tool 704 may be positioned at a known starting location such as right or left end of the workpiece 106 near the right or the left clamping 734, 732. In step 820, the controller 760 may initiate power and electrolyte flow to start the EC polishing process.

In step 830, the FEC tool 704 traces the workpiece 106 under the control of the controller 760 until an end side of the workpiece 106 is reached. For example, if the FEC tool 704 initially engages the workpiece 106 near the right clamping 734, the first tracing motion would be to move the FEC tool 704 towards the left clamping 732 until the FEC tool 704 reaches the left clamping 732. While the FEC tool 704 is moving, the controller 760 causes the power and electrolyte to be maintained, i.e., the EC polishing process is carried continuously out. Also as the FEC tool 704 is moved, it continually adapts to the surface contour of the workpiece 106.

When the end side is reached, the controller 760 can determine whether or not the EC polishing process is complete in step 840. The criteria for determining whether the ECM polishing is finished may depend on the particular circumstances. As an example, tracing the entire surface of the workpiece 106 once may be deemed complete. In another circumstance, tracing only a portion of the entire surface may suffice. If a very smooth surface is desired, then the workpiece 106 may be traced more than once.

If in step 840 it is determined that the EC polishing process is not complete, then in step 850, the controller 760 may cause the FEC tool 704 to be repositioned. For example, the controller 760 may instruct the right and left clampings 732, 734 to rotate the workpiece 106 in the "w" direction. After the FEC tool 704 is repositioned, step 830 can be repeated to trace the workpiece 106 until the other end is reached. During the tracing step, the EC polishing process can be continuously carried out. The controller 760 may continue the loop of steps 830, 840, and 850 until when in step 840, it is determined the EC polishing process is complete. Then in step 860, the controller 760 may cause the FEC tool 704 to be disengaged from the workpiece 106.

Figure 9A:
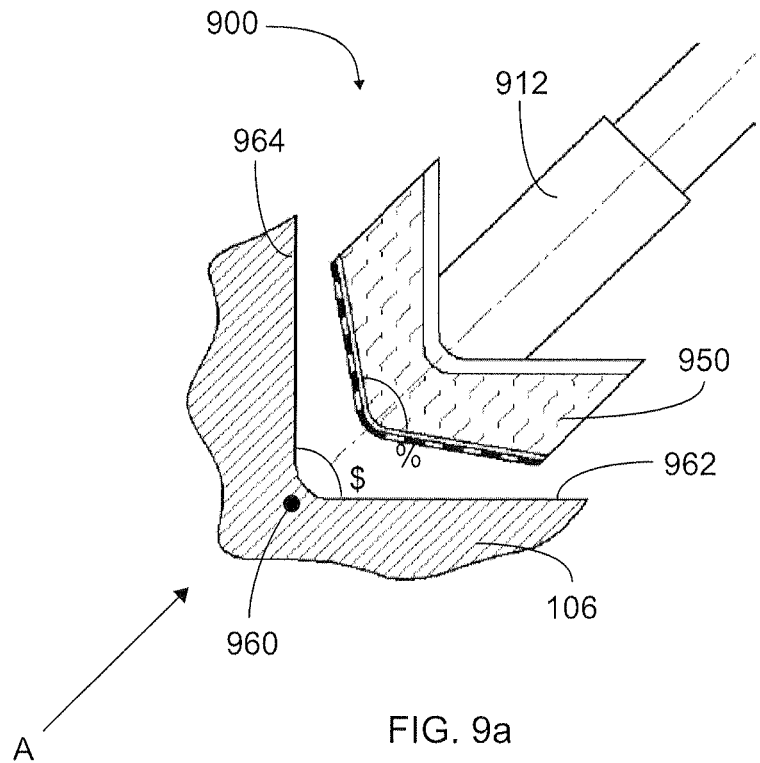
FIGS. 9*a* and 9*b* illustrate a cornering flexible electrochemical tool according to another embodiment of the present invention.
Figure 9B:
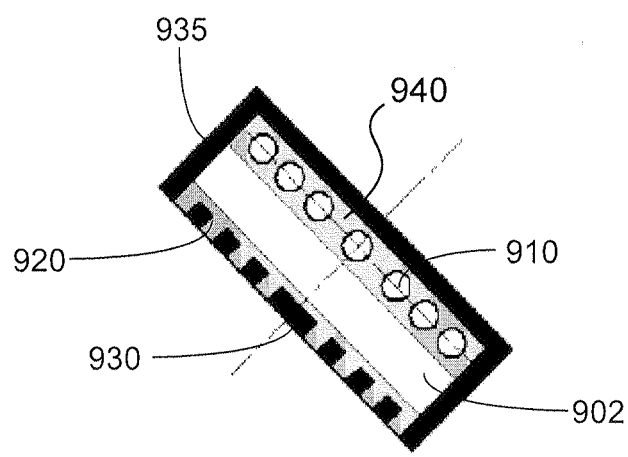

While the FEC tools 400 and 600 are extremely useful, there are circumstances where workpiece contour is very aggressive such as corners and edges. In these circumstances, alternative designs of the flexible FEC tool may be desirable. FIGS. 9a and 9b illustrate a flexible FEC tool 900 according to another embodiment of the present invention. The FEC tool 900 may be referred to as a cornering FEC tool 900. FIG. 9a illustrates a side view of the FEC tool 900, and FIG. 9b illustrates the FEC tool 900 as viewed from the position A in FIG. 9a.

The structure of the FEC tool 900 can be similar to the structure 500 illustrated in FIG. 5. The FEC tool 900 may includes the plurality of inlets 910, a plurality of outlets 920, a plurality of insulation spacers 930 and standoffs 935, insulating coatings 940, and a cathode 902, which can be a strip or a sheet cathode, as seen in FIG. 9b. These components may serve similar functions of the components of the structure 500 illustrated in FIG. 5 and thus will not be described further.

But as seen in FIG. 9a, the FEC tool 900 can include an elastomer 950, which provides an adaptive backing so that the FEC tool 900 can adapt to a corner of the workpiece 106. Note that in FIG. 9b, the elastomer 950 is such that it is more backfilled near the edge of the cathode 902 then at the center. This helps to provide a tight sealing for the electrolyte and workpiece pressure for corner adaptation.

Generally, the corner of the workpiece 106 can be viewed as two side surfaces 962 and 964 that extend substantially in straight directions from a corner point 960 forming a concave surface, and the corner angle $\theta$ can be viewed as the angle made by the side surfaces 962 and 964. The corner angle $\theta$ can be a right angle as illustrated in FIG. 9b or can be other angles. The angle $\theta$ is not specifically limited. In many instances, corner angles that range between 80° and 100° are typical.

The bottom layer of the FEC tool 900 can be pre-bent to a blunt angle $\alpha$ that is not necessarily the same as the corner angle $\theta$. Preferably, the pre-bent angle $\alpha$ should be at least substantially equal to the corner angle $\theta$ of the workpiece, $\alpha-\theta\approx 0$. However, it is even more preferred that the relationship $\alpha-\theta>0$ holds, i.e., the blunt angle $\alpha$ of the FEC tool 900 is preferred to be greater than the corner angle $\theta$ of the workpiece 106.

In operation, this cornering FEC tool 900 may be first squeezed into the workpiece corner part to have a tight fit under the force of the machine ram 912. When the FEC tool 900 is squeezed into the corner, compression along the edge of the cathode 902 is likely to be lower than the compression in a center thereof when $\alpha-\theta\approx 0$, i.e., when they are substantially at the same angle. When $\alpha-\theta>0$, the compression along the edge will increase which thereby minimizes the compression difference between the edge and the center of the cathode 902. That is, the compression difference tends to zero as the difference $\alpha-\theta$ increases. Eventually, the compression on the edges may become greater than in the center as $\alpha-\theta$ continues to increase.

Thus, in one aspect, the cornering tool 900 is such that the difference $\alpha-\theta$ is greater than or substantially equal to a minimum angular difference and less than or substantially equal to a maximum angular difference. The minimum and maximum angular differences may be determined being the range of angular differences in which the pressure differences between the edge and center of the FEC tool remains within a predetermined tolerable range. Minimum and maximum angular differences respectively being 10 and 45 degrees are satisfactory in some EC processes.

Figure 10B:
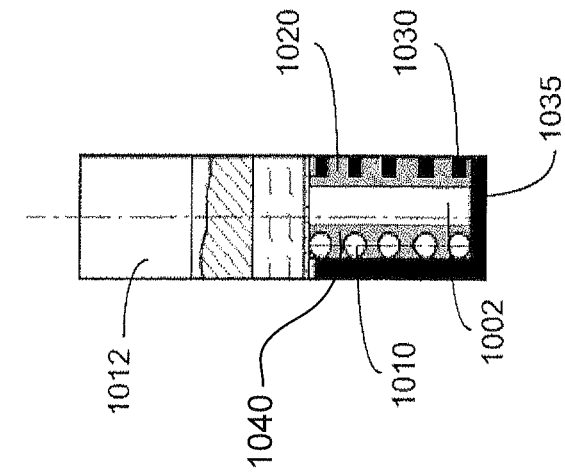
FIGS. 10*a* and 10*b* illustrate an edging flexible electrochemical tool according to another embodiment of the present invention.
Figure 10A:
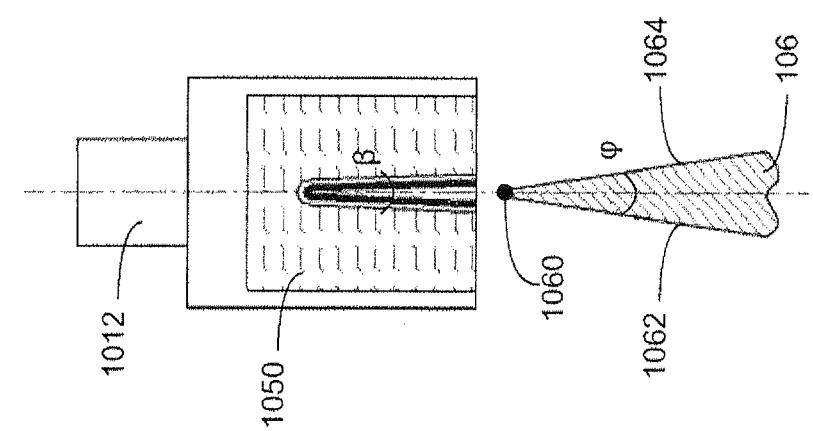

FIGS. 10a and 10b illustrate a FEC tool 1000 according to another embodiment of the present invention. The FEC tool 1000 may be referred to as an edging FEC tool 1000. FIG. 10a illustrates a side view of the FEC tool 1000. FIG. 10b illustrates a cross-section view of the structure of the FEC tool 1000 as viewed from the position A along the line A-A. Generally, an edge of the workpiece 106 can be viewed as two side surfaces 1062 and 1064 that extend substantially in straight directions from an edge point 1060 forming convex surface, and the edge angle can be viewed as the angle $\phi$ made by the side surfaces 1062 and 1064.

The edging FEC tool 1000 may includes the plurality of inlets 1010, a plurality of outlets 1020, a plurality of insulation spacers 1030 and standoffs 1035, insulating coatings 1040, and a cathode 1002, which can be a strip or a sheet cathode, as seen in FIG. 10b. These components may serve similar functions as described with respect to similar components of FIGS. 5 and 9b, and thus will not be described further.

Like the cornering FEC tool 900, the edging FEC tool 1000 can include an elastomer 1050, which provides an adaptive backing so as to adapt to the edge of the workpiece 106. The edges may be more backfilled than the center where the bent occurs. The cathode 1002 is pre-bent. However, the pre-bent angle $\beta$ is preferably more severe than an edge angle $\phi$ of the workpiece 106 such that the relationship $\beta-\phi\approx 0$ holds. It is even more preferred that the relationship $\beta-\phi<0$ holds.

In operation, this edging FEC tool 1000 may be first squeezed into the workpiece edge part to have a tight fit between the flexible cathode 1002 and the part edge. As the FEC tool 1000 is swept through the edge, FEC tool opening and side curvature vary to keep a tight contact with the part surface near the edge area.

For a pre-bent angle $\beta$ of the cathode 1002, the FEC tool 1000 can be used on edges with angles $\phi$ that range from $\phi_0$ to $\phi_1$, i.e., $\phi_0 \leq \phi \leq \phi_1$, such that within the edge angle range $\phi_1-\phi_0$, the compression difference between any parts of the cathode 1002 is within the predetermined tolerance limits. For example, the range $\phi_1-\phi_0$ is preferably 10 degrees or less. That is, an edging tool 1000 that is nominally designed for a particular angle $\phi$ may be used for edging surfaces whose angles are within few degrees of the nominal angle. Even more preferable is that the range $\phi_1-\phi_0$ be 2 degrees or less Note that a zero tool angle can be provided for very sharp angles. In the zero angle edging tool 1000, the pre-bent angle $\beta$ of the tool 1000 from the edge point 1060 made by side surfaces 1062 and 1064 may be zero for at least a part when the tool 1000 is not engaged with the workpiece 106. The backfill provided by the elastomer 1050 deforms accordingly to provide the necessary pre-bent angle and fitting. The edging FEC tool 1000 can be used for continuous or intermittent polishing as the workpiece 106 is driven relative to the FEC tool 1000.

Figure 11A:
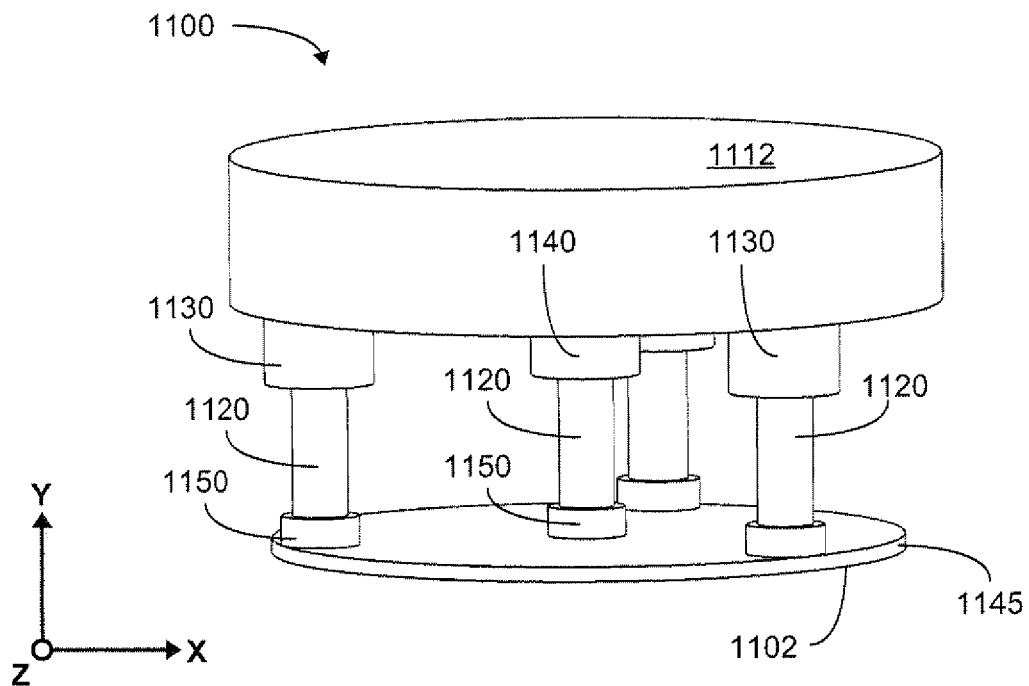
FIGS. 11*a* and 11*b* illustrate a 3D flexible electrochemical tool according to an embodiment of the present invention.
Figure 11B:
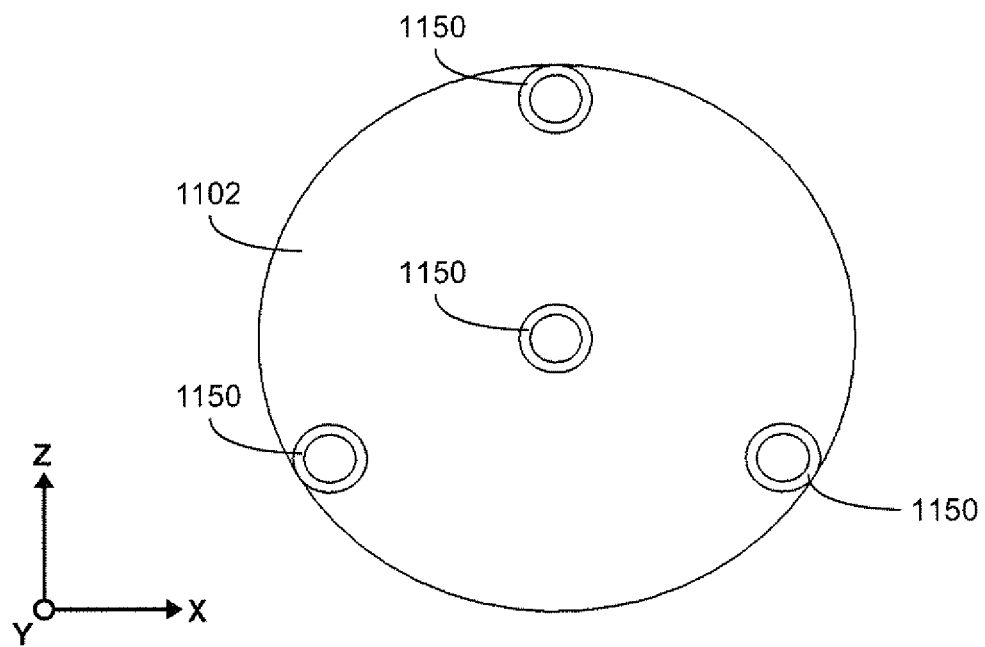

Up to this point, examples of 2D FEC tool have been illustrated and described. FIGS. 11a and 11b illustrates a flexible three dimensions (3D) FEC tool according to an embodiment of the present invention. The FEC tool 1100 can include a sheet metal 1102, a machine ram 1112, and a plurality of support connectors 1120. The machine ram 1112 can be connected with the support connectors 1120 at the upper ends thereof. The lower ends of the support connectors 1120 can connect with the sheet cathode 1102 at various parts along an upper surface of the sheet cathode 1102.

The sheet cathode 1102 is preferably elastically deformable in 3D. In FIGS. 11a and 11b, the sheet cathode 1102 can be part of a layered structure that includes an elastic backing 1145 in the XZ plane. As seen, when the sheet cathode 1102 is in the uncompressed state, the support connectors 1120 can be oriented in the Y direction which is normal to the XZ plane of one sheet cathode 1102. When a surface part of a workpiece 106 (not shown) compresses the layered cathode 1102, along different XZ points, the sheet cathode 1102 can deform elastically in the Y direction to conform to the surface contour of the workpiece 106, either concave or convex. The sheet cathode 1102 can deform to continually conform to a 3D surface contour of the workpiece 106 such that the surface of the workpiece 106 is traced as it is moved in relation to the sheet cathode 1102. In this manner, the workpiece 106 can be continually polished.

The support connectors 1120 can vary their strokes as the sheet cathode 1102 elastically deforms in 3D, which can also change the lengths of the support connectors 1120. But regardless of the strokes, it is preferred that the support connectors 1120 apply a uniform pressure, thus providing vertical flexibility to enable the sheet cathode 1102 to adapt to the curved surface of the workpiece. In one embodiment, the support connectors 1120 comprise air cylinders similar to the cylinders 420 illustrated in FIG. 4*a*. That is, while not shown in FIGS. 11*a* and 11*b*, each cylinder 1120 may include a vertical sliding bearing 1127 and a spring 1128 providing elastic support, and may include a piston 1129 which can be moved to change the stroke of the cylinder 1120. The amount of piston movement, and therefore the amount of stroke depends on the surface height of workpiece contour when compressed. The drive mechanism can be incorporated in the machine ram 1112. Further, it is preferred that the pressure exerted by the plurality of support connectors 1120 be substantially equal regardless of the length of the stroke.

At the upper end thereof, at least one support connector 1120 may be coupled to the machine ram 1112 by an upper coupler 1130 which is rotatable in two orthogonal directions such as a ball joint. At the lower end thereof, each support connector 1120 may have a lower coupler 1150 connecting the sheet cathode 1102 with the support connector 1120.

In one embodiment, the lower coupler 1150 can include a mechanism that is rotatable in two orthogonal directions (e.g., a ball joint) connected to a pad, and the pad may be attached to the sheet cathode 1102.

Such rotatable lower couplers 1150 allow the support connectors 1120 to adapt substantially normally to the workpiece surface contour.

In another embodiment, the lower coupler 1150 may include the pad, but not include the rotatable mechanism. It is described above that the sheet cathode 1102 can be a layered structure. The structure preferably includes an elastic backing 1145 (e.g., elastomeric backfill or rubber backing) on the sheet metal 1102, and the pad is attached to the elastic backing 1145. Thus, even when the lower coupler 1150 does not include the rotatable mechanism, the connection of the support connector 1120 with the sheet cathode 1102 is not necessarily rigid, and some amount of adaptation normal to the workpiece contour can still occurs.

It should be noted that even in the embodiment that does include the rotatable mechanism, the sheet cathode 1102 still preferably includes the elastic backing 1145.

In the flexible EC operation, the FEC tool 1100 can be compressed between the workpiece 106 below and the machine ram 1112 above. The support connectors 1120 at the same pressure can take different strokes according to the surface part of the workpiece 106. The lower couplers 1150 can connect the sheet cathode 1102 with the support connectors 1120, and the upper couplers 1130 can allow an appropriate contact angle to be maintained between the support connectors 1120 and the machine ram 1112. As the FEC tool 1100 traces the surface part, the support connectors 1120 can take different strokes and provide lateral rigidity for the driving force. Electrolyte and power connections are left out for clarity. Note the center support connector with air cylinder need not have the ball joint on the top. This center support connector provides the main lateral rigidity. However, this is not a strict requirement as will be shown below.

It is preferred that the upper couplers 1130 have a predetermined limited angular range of rotation in the two orthogonal directions. In this instance, each support connector 1120 may have the corresponding upper coupler 1130 such that they are all non-fixed support connectors 1124. However, it is also possible that at least one support connector 1120 includes a fixed connection 1140 at its upper end such that the support connector 1120 is fixed in the XZ position relative to the machine ram 1112. In FIG. 11*a*, the fixed support connector 1120 can be the center support connector. But this is merely an example and not a limitation. Any of the support connectors 1120 may be fixed.

The embodiments of the flexible FEC tools illustrated in FIGS. 4*a*-11*b* are excellent choices to trace the workpiece 106 for the flexible EC polishing process. In other words, the FEC tool 704 used in the flexible EC polishing method illustrated in FIG. 8 maybe any of the FEC tools 400, 600, and 1100. When aggressive surfaces such as corners and edges require EC polishing, the workpieces 900 and 1000 may be used.

However, most if not all of the FEC tool embodiments may also be used for flexible EC finishing. For the purposes of this document, finishing refers to a process in which surface errors of the workpiece are corrected. In this context, a surface error is defined as a deviation in the contour of a surface part of the workpiece, e.g., deviation in the surface height, which is beyond a predetermined tolerance range allowed for that surface part.

Finishing provides a way to perform a precise near net shape forming. Using forming processes such as casting or forging provides the final workpiece shape without surface finishing. Achieving near net shape by precise forming has been desired for many decades to reduce or even eliminate the need for final machining since this would simplify the process and reduce the cost.

Processes such as investment casting and net forging can provide precise forming to meet tight tolerances as small as 0.001" or one mil. However, this is accomplished at great costs and can be done only for limited part sizes. It is fundamentally difficult for a forming process to handle bulk material while holding the surface precision. Generally, displacing the bulk material makes it difficult to keep surface accuracy. Also, forming costs increase exponentially as the part tolerances get tighter and the part size gets larger. If final machining is still needed for tighter tolerances, the original purpose of net shaping is defeated or diminished. Despite the reduced stock removal, a precise and expensive 5 axis computed numerically controlled (CNC) machining may still be required to contour the 3D surfaces.

In addition, the surface quality from the forming processes usually cannot meet most part specifications. The surface roughness is usually high after the surface part is directly solidified or forged. In most instances, there is a layer of rough surface grains on any casting or forging due to the slow surface cooling rate. Surface oxidation is often a problem without finishing.

To relieve the cost pressure of stringent forming precision and allow bulk material and surface to be handled economically at the same time, it becomes necessary to implement efficient surface finishing after near-net shaping. In this way, conventional machining for large stock removal can be simplified or even revolutionized to handle only the surface materials since near net forming eliminates the need of rough machining. Rough and fast handling can usually be better done by forming to save materials and energy.

In an aspect of the present invention, the flexible FEC tools are provided which can be used for the flexible EC finishing a workpiece after near-net forming. For example, the workpiece 106 such as nozzles or buckets of a turbine may be initially near-net formed through investment casting. The flexible FEC tools, much like the FEC tools 400, 600, 900, 1000, and 1100 described above, can adapt to the near-net formed airfoil surface without the CNC motion. As the flexible cathode traces through the workpiece surface, the FEC process can polishes the surface and also correct residual errors, i.e., the surface can be finished.

To enable the flexible EC finishing, the FEC tool preferably includes a sensor that can detect a surface height of the workpiece. A controller can compare the detected height with stored part geometry. Depending on the correction that is necessary, the controller can control any combination of the factors that affect the material removal such as the electrical voltage, the tracing speed, the electrolyte flow and pulse parameters if pulse power is applied.

There are numerous advantages to the flexible EC finishing. For example, the flexible EC finishing can remove the need to provide a powerful machine spindle. Also, there is little to no tool wear even for hard and resistant inconel. The mechanical load can be low while providing high structural accuracy. Further, fast polishing and finishing can be accomplished with relatively few flexible FEC tools.

Figure 12A:
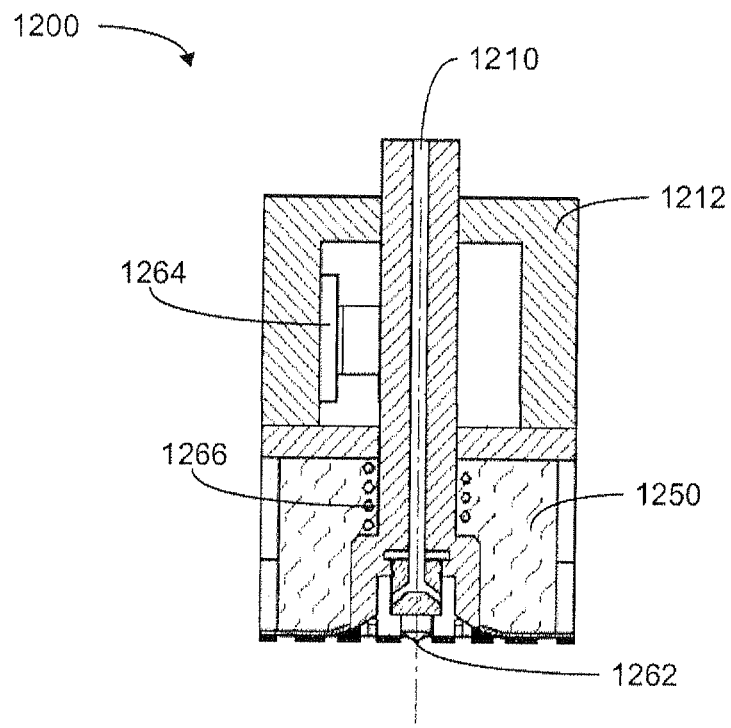
FIGS. 12*a* and 12*b* illustrate a 3D flexible electrochemical tool according to another embodiment of the present invention.
Figure 12B:
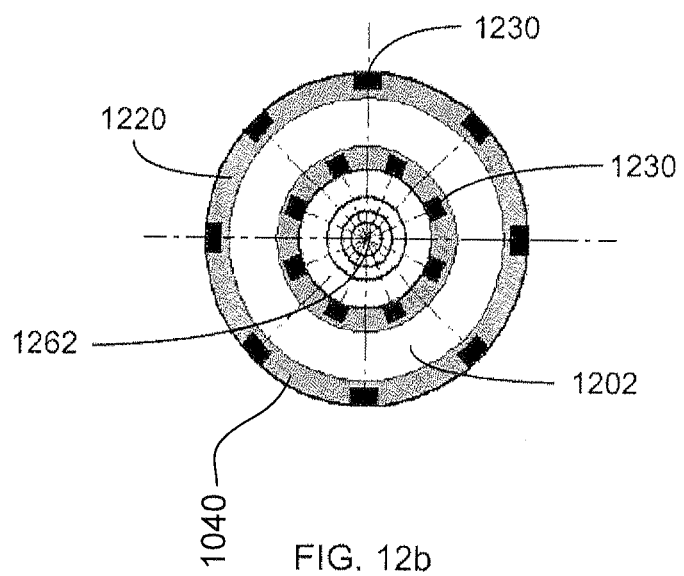

FIGS. 12a and 12b illustrate a flexible 3D FEC tool 1200 according to another embodiment of the present invention. The FEC tool 1200 can be used for flexible EC polishing like the FEC tool 1100. But in addition, the FEC tool 1200 can also be used for flexible EC finishing. FIG. 12a is a side view and FIG. 12b is a bottom view of the FEC tool 1200.

The FEC tool 1200 can include a sheet cathode 1202, spacers 1230, an elastomeric backing 1250, and an electrolyte inlet channel 1210. A machine ram 1212 can position the FEC tool 1200 so as to engage the workpiece in a desired manner. Preferably, the cathode 1202 is a relatively thin and flexible, electrically conducting material, such as copper and stainless steel. The elastomeric backing 1250 can provide an elastic backing to allow the cathode 1202 to deform, and thus conform to the surface contour of the workpiece. The elastic deformation can be such that the outer surface of the cathode 1202 is at a desired distance from the surface of the workpiece 106 allowing efficient ECM processes to be carried out. In this way, the FEC tool 1200 can continuously polish a general 3D surface without requiring numerous cathode dies.

FIG. 12b illustrates a cathode structure of the FEC tool 1200. Spaces between a plurality of insulation spacers 1230 define a plurality of outlets 1220 to allow the electrolyte flowing in from the inlet channel 1210 to flow out. The spacers 1230 guide the electrolyte from the inlet 1210 to the outlets 1220. The spacers 1230 form the inter-electrode gap between the cathode 1202 and the workpiece. In this particular embodiment, the spacers 1230 closer to the center may be formed more thickly than the spacers 1230 closer to the edge or periphery to allow a better electrolyte flow from the center. Insulating coatings 1240 can be formed in areas corresponding to the spacers 1230 where the electrolyte flow is not likely to be stable.

The FEC tool 1200 may be used in the ECM polishing operation illustrated in FIGS. 7 and 8. That is, the FEC tool 1200 can be applied to different parts of the workpiece 106 and the tooling structure can be compressed between the workpiece surface part below and the machine ram above. The elastomeric backing 1250 can provide the necessary elastic compression to seal the electrolytic cell that conforms to the surface of the workpiece. As the workpiece 106 and the tooling cathode 1200 are moved relative to each other, the sheet cathode 1202 can conform to the contour of the surface part engaged with the sheet cathode 1202, and the ECM polishing can be carried out by turning on the current and flowing the electrolyte between the gap of the workpiece surface and the sheet cathode 1202.

But in addition, the FEC tool 1200 can also include a sensor that senses the surface height of the workpiece 106 during tracing, i.e., during the continuous movement. In FIGS. 12a and 12b, the sensor 1260 is implemented as a combination of a stylus 1262, a linear scale 1264, and a spring 1266. This combination is but merely one of many ways to implement the sensor 1260. Other implementations of the sensor include LVDT linear variable differential transformers and capacity sensors.

The stylus 1262 can be disposed substantially at a center of the FEC tool 1200 as shown, but this is not a limitation. The stylus 1262 may be placed elsewhere. For example, the stylus 1262 may be placed in "front" of the cathode 1202 in the tracing direction. Further, the number of sensors is not limited to one, i.e., multiple sensors may be provided. For example, two styluses 1262, one on each side of the cathode 1202 in the tracing direction.

Figure 13A:
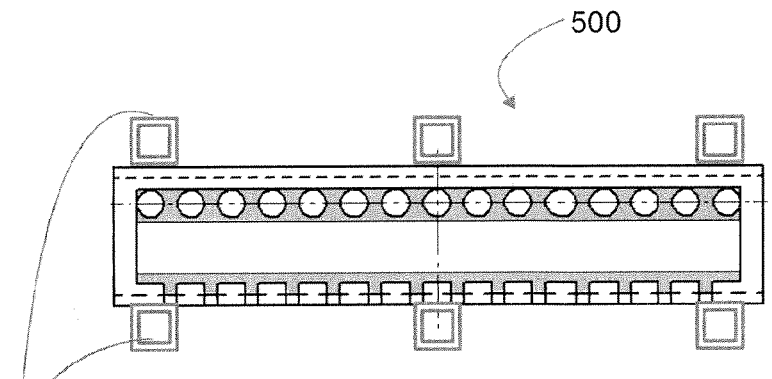
FIGS. 13a and 13b illustrate a flexible electrochemical tool with sensors according to another embodiment of the present invention.
Figure 13B:
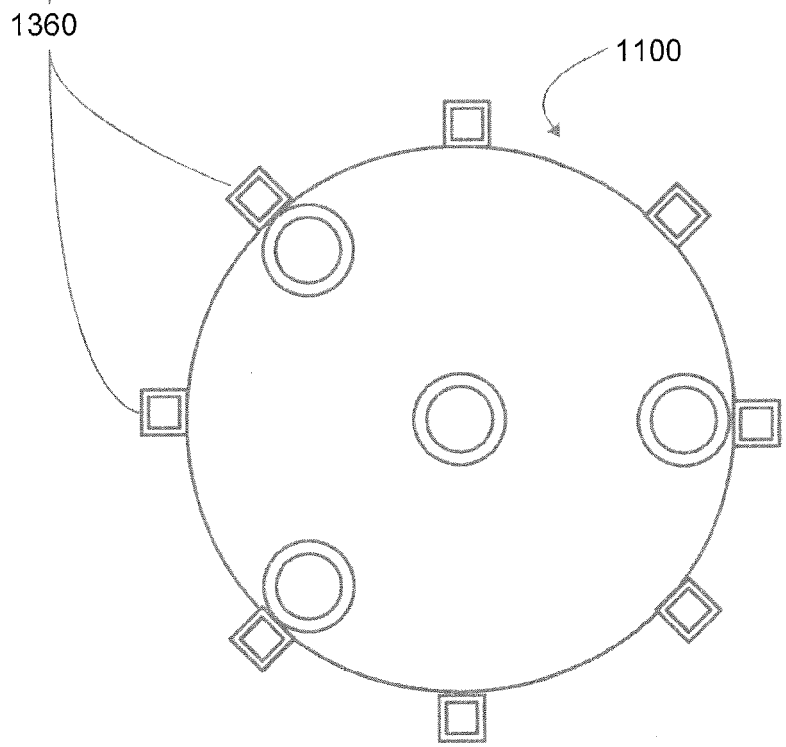

It should be noted that sensors may be added to the FEC tools 400, 600, and/or 1100 for use in the flexible EC finishing as illustrated in FIGS. 13a and 13b. In FIG. 13a, the cathode structure 500 is reproduced and in FIG. 13b, the bottom view of the FEC tool 1100 is reproduced. In these figures, sensors 1360 drawn as doubled squares are distributed around each cathode structure. Other components such as inlets, spacers, couplers and outlets are not numbered for clarity. While more sensors 1360 are desirable, there may be some practical considerations such as cost that may factor into how many sensors may actually be deployed. It suffices to say that with the type of modifications illustrated in FIGS. 13a and 13b, the FEC tools 400, 600 and 1100 can also be used for flexible EC finishing workpieces.

Figure 14:
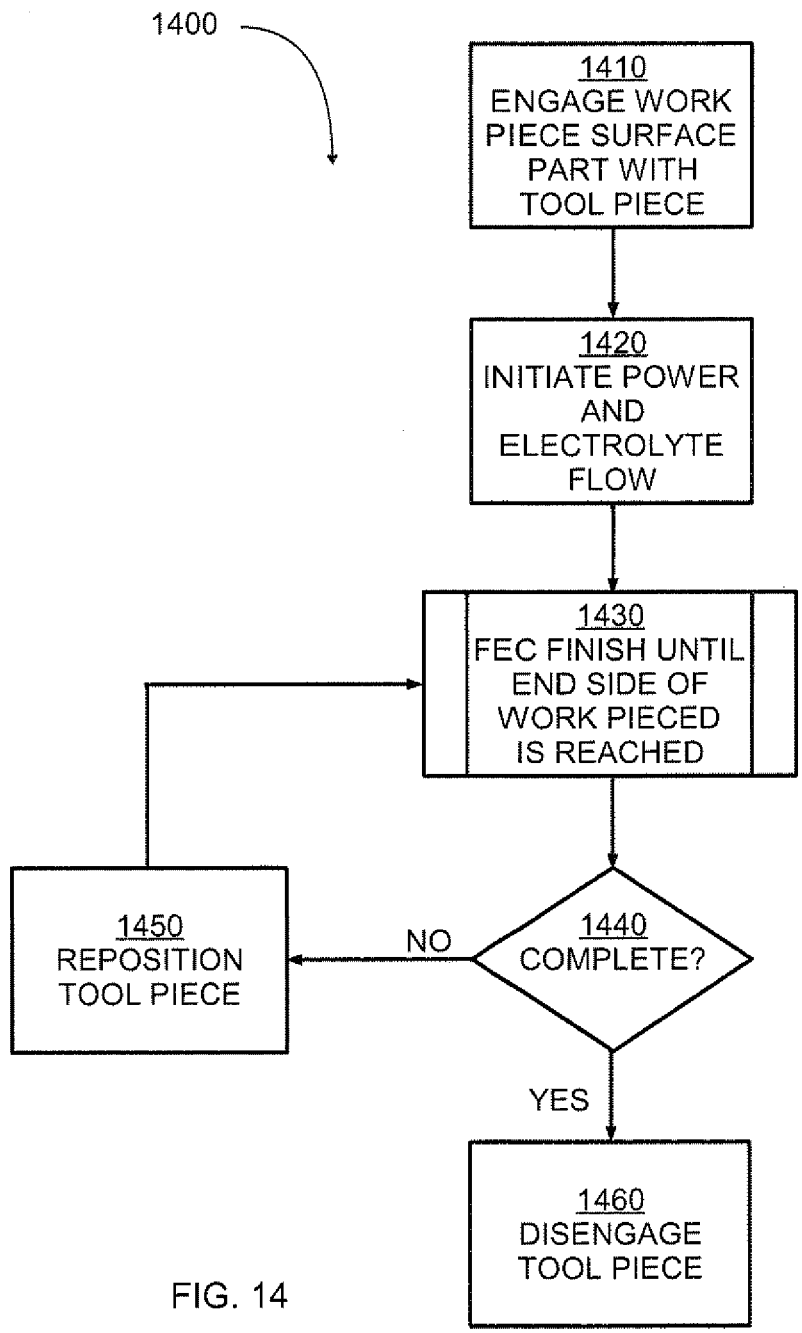
FIG. 14 illustrates a flow chart of a method to perform a flexible electrochemical finishing process according to an aspect of the present invention.

FIG. 14 illustrates a flow chart of a method to perform flexible EC finishing according to an aspect of the present invention. Note that the method 1400 of performing the flexible EC finishing share many of the steps in common with the flexible EC polishing method 800 illustrated in FIG. 8. Like the flexible EC polishing process, the flexible EC finishing process can adapt to the contour of the workpiece surface. But instead of simply conforming to the existing surface contour, the cathode tool's elastic deformation can be actively controlled so that the workpiece is contoured to a desired final shape. In FIG. 14, it is assumed that the workpiece 106, such as a bucket of a steam turbine, has been initially near-net shaped through another process such as investment casting, forging, or even through conventional ECM using a fixed shaped FEC tool. The system 700 illustrated in FIG. 7 will be used in conjunction to describe the example flexible EC finishing method 1400 in which the FEC tool 704 may be any of the FEC tools 400, 600, 1100, and 1200 with sensors.

In the method 1400, the controller 760 may position the FEC tool 704 to engage a surface part of the workpiece 106 in step 1410. Preferably, the FEC tool 704 is positioned at a known starting location of the workpiece 106. In step 1420, the controller 760 may initiate power and electrolyte flow to start the ECM process.

Figure 15:
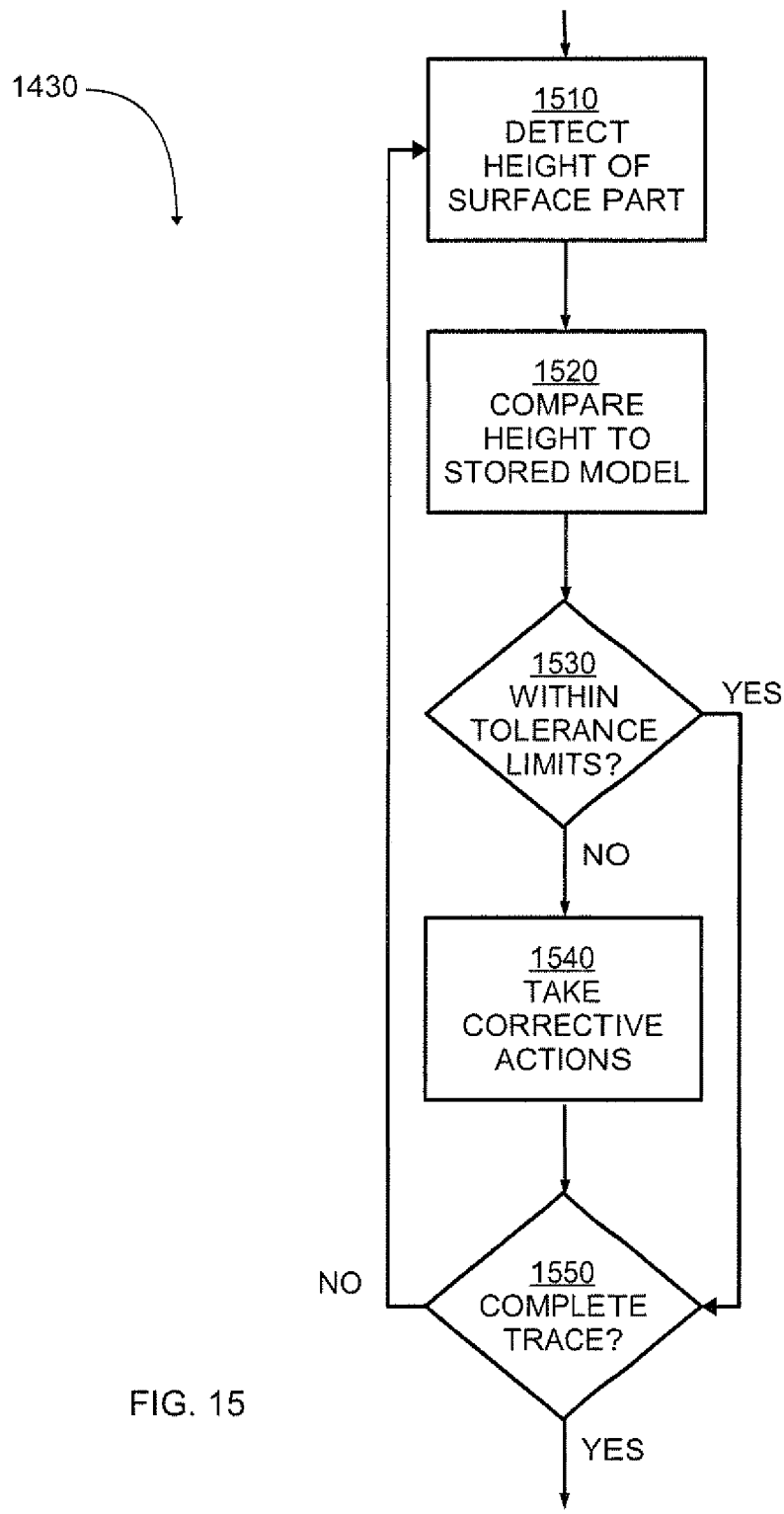
FIG. 15 illustrates a flow chart of an example flexible electrochemical finishing process carried out during a workpiece trace according to an aspect of the present invention.

In step 1430, the controller 760 can cause the FEC tool 704 to trace the workpiece 106 until an end side of the workpiece 106 is reached. During the trace, the workpiece 106 is subjected to the flexible EC finishing process. FIG. 15 illustrates a flow chart of an example process to carry out the step 1430 to perform the flexible EC finishing process during a trace of the workpiece according to an aspect of the present invention. The process illustrated in FIG. 15 can be assumed to be continually performed as the FEC tool 704 is moved from one end to the other end of the workpiece 106.

In step 1510, the height of the surface part may be detected through a sensor such as the sensor 1260, 1360. The sensor 1260, 1360 may provide the detected result to the controller 760. In step 1520, the controller 760 may compare the detected surface height against a stored model for that particular surface part of the workpiece 106. In step 1530, the controller 760 may determine whether or not the difference between the detected height and the stored model height is within tolerance limits.

It should be noted that tolerances for workpieces can range from very general to very specific. In one instance, the same tolerance limits may apply for the entire surface of the workpiece or even across several workpieces. In another instance, different surface parts within one workpiece may have tolerance limits that only apply to the particular surface parts. Indeed, different tolerance limits may apply to the same workpiece under different circumstances. For example, a workpiece manufacturer may offer different levels of guarantees for the same workpiece. For the highest guarantee level commanding the highest price, very tight tolerances may be applied in finishing the workpiece. For other guarantee levels, correspondingly greater deviations from the stored model may be tolerated.

If the difference is within the tolerance limits, then the process can proceed to step 1550 to determine whether this trace is completed, e.g., the controller 760 may determine whether the end side of the workpiece 106 has been reached. If the trace is not complete, then the process may repeat from step 1510.

If however it is determined in step 1530 that the detected height is outside the tolerance limits, the controller 760 may take corrective action or a combination of actions in step 1540. A non-exhaustive list of corrective actions includes the following. First, the shape of the cathode 1202 may be altered. As described above, the FEC tools 400, 600 and 1100 can include drive mechanisms which can be controlled to vary the strokes of the support connectors 420, 620, and 1120. Depending on the corrections that may be necessary, the controller 760 may alter the support connector strokes so as to vary the amount of the EC processing taking place under different portions of the cathode. For example, for a surface part that require relatively more or less removal of material, the stroke of the support connector 420, 620, 1120 may be controlled to decrease or increase the inter-electrode gap. Since the workpieces are already near-net shaped, drastic active shaping of the flexible cathode is unlikely to be necessary.

Second, the tracing movement can be altered. For example, the controller 760 may cause the FEC tool 704 to move slower or even faster as needed. The speed of movement may correspond to the amount material removal required to bring the surface part height to within tolerance limits. Generally, slower speed will enable more EC processing to be performed to the surface part. Indeed, it may even be that the direction of the trace may be reversed for a short distance before proceeding back in the original tracing direction.

Third, current may be increased or decreased as necessary. If a surface part requires relatively more or less EC processing, the controller 760 may cause the power supply to increase or decrease the current flow as the FEC tool 704 passes over the surface part. The controller 760 may also control the electrolyte pump to increase or decrease the electrolyte flow as needed.

Of course, the controller 760 may combine any of the described corrective actions to effectuate the ECM finishing. After the corrective actions are taken in step 1540, the controller 760 may proceed to step 1550.

If at step 1550 it is determined that the particular trace run is complete, then the process 1430 is exited and the method resumes in step 1440 in FIG. 14. In this step, the controller 760 may determine whether the entire flexible EC finishing process is completed. As noted with respect to the flexible EC polishing method of FIG. 8, the criteria for determining whether the flexible EC finishing process is completed may depend on the particular circumstances.

If in step 1440 the controller 760 determines that the flexible EC finishing is not complete, then in step 1450, the controller 760 may reposition the FEC tool 704, for example, by causing the clampings 732, 734 to rotate the workpiece 106. After the FEC tool 704 is repositioned, the controller 760 may proceed to step 1430 to repeat the flexible EC finishing as the FEC tool 704 moves in the other direction. The controller 760 may repeat the loop of steps 1430, 1440, and 1450 until in step 1440, it is determined the flexible EC finishing is complete. Then in step 1460, the FEC tool 704 can be disengaged from the workpiece 106.

In addition to flexible EC polishing and finishing processes, the flexible tracing may be used to finally shape the workpieces as well. It has been described that in industries such as power generation, even an incremental gain in efficiency can represent significant cost savings. It has also been described that with the conventional ECM, retooling can be an expensive process. Retooling, that is manufacturing a new FEC tool, may also take significant amount of time.

The flexible EC processes described above can be used to mitigate such costs and time. For example, there may be circumstances in which a relatively small change in the design of an existing workpiece is shown to provide beneficial efficiency improvements. In these circumstances, the workpiece may be initially fashioned using existing molds, dies, or FEC tools. The initially fashioned workpiece may be subjected to the flexible EC shaping process with the new design. In effect, the changes between the old and the new design can be treated as errors to be corrected through the flexible EC finishing process. Such process can be used to start manufacturing the newly designed workpieces while molds, dies, and FEC tools specific to the new design can come on line. This can enhance the chances of a manufacturer to be the "first-to-market".

Such process can also be used to relatively quickly test a new design. For example, computer modeling may indicate that a tweaked design is promising, but a real-world test is required for confirmation. Instead of incurring the time and expense of retooling for testing purposes, the flexible EC finishing process can be used to fabricate the testing workpiece.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flexible electrochemical tool for use in performing a flexible electrochemical process for use in performing a flexible electrochemical process on a workpiece, the flexible electrochemical tool comprising:
   a strip cathode elastically deformable in two dimensions (2D);
   a machine ram; and
   a plurality of support connectors connected with the machine ram at upper ends thereof and connected with the strip cathode at lower ends thereof along a length of the strip cathode, wherein the plurality of support connectors includes at least one fixed support connector whose lateral position is fixed relative to the machine ram, each support connector is arranged to vary in stroke such that a length of that support connector changes as the strip cathode elastically deforms, and each support connector includes a rotating coupler arranged to couple the lower end of the support connector and arranged to turn as the strip cathode elastically deforms.

2. The flexible electrochemical tool of claim 1, wherein the plurality of support connectors also includes at least one non-fixed support connector slidably coupled to the machine ram at its upper end via a sliding coupler to enable the non-fixed support connector to move laterally relative to the machine ram as the strip cathode elastically deforms such that the non-fixed support connector extends or contracts from the machine ram substantially vertically.

3. The flexible electrochemical tool of claim 1, wherein
the rotating couplers are lower rotating couplers, and
the plurality of support connectors also includes at least one non-fixed support connector rotatably coupled to the machine ram at its upper end via an upper rotating coupler to enable the non-fixed support connector to rotate as the strip cathode elastically deforms.

4. The flexible electrochemical tool of claim 1, wherein
the strip cathode elastically deforms to continually conform to a 2D surface contour of the workpiece such that the surface of the workpiece is traced as the workpiece is moved in relation to the strip cathode, and
each support connector is arranged to vary its stroke to continually adapt to the elastic deformation of the strip cathode while applying substantially a constant pressure regardless of changes in its stroke.

5. The flexible electrochemical tool of claim 1, wherein each support connector is arranged to actively vary its stroke based on a control signal so as to elastically deform the strip cathode.

6. The flexible electrochemical tool of claim 1, wherein at least one support connector is a cylinder comprising a sliding bearing, a spring, and a piston.

7. The flexible electrochemical tool of claim 1, wherein the strip cathode is housed in a cathode structure, the cathode structure comprising:
a plurality of inlets arranged to provide an inflow of electrolyte;
a plurality of insulating spacers spaced apart from each other, the spaces in between the insulating spacers defining a plurality of outlets arranged to provide an outflow of the electrolyte;
one or more insulating standoffs arranged to guide the electrolyte to flow from the plurality of inlets to the plurality of outlets; and
an insulating coating applied to areas corresponding to the plurality of inlets and the plurality of outlets, wherein
the plurality of insulating spacers and one or more insulating standoffs are at a predetermined thickness so as to provide an inter-electrode gap between the strip cathode and the workpiece.

8. The flexible electrochemical tool of claim 1, wherein the strip cathode is formed of a sheet metal, the sheet metal cathode being elastically deformable in a vertical direction along different points of the cathode in a lateral direction.

9. A flexible electrochemical tool to perform a flexible electrochemical process on a workpiece, the flexible electrochemical tool comprising:

a sheet cathode arranged to elastically deform in three dimensions (3D);
a machine ram; and
a plurality of support connectors connected with the machine ram at upper ends thereof and connected with the sheet cathode at lower ends thereof along an upper surface of the sheet cathode, wherein
each support connector is arranged to vary in stroke such that a length of that support connector changes as the sheet cathode elastically deforms, and
each support connector includes a lower connector arranged to couple the lower end of the support connector with the sheet cathode as the sheet cathode elastically deforms.

10. The flexible electrochemical tool of claim 9, wherein the plurality of support connectors are all non-fixed support connectors, each including an upper coupler at its upper end to couple the non-fixed support connector with the machine ram, the upper coupler being rotatable in two orthogonal directions within a predetermined angular range.

11. The flexible electrochemical tool of claim 9, wherein the lower connector comprises:
a rotatable mechanism rotatable in two orthogonal directions; and
a pad connected to the rotatable mechanism and attached to the sheet cathode, wherein
the rotatable mechanism and the pad allow the support connector to adapt substantially normally to the workpiece surface contour.

12. The flexible electrochemical tool of claim 9, wherein
the plurality of support connectors includes at least one fixed support connector whose lateral position is fixed relative to the machine ram as the sheet cathode elastically deforms via a fixed connection at its upper end, and
each non-fixed support connector includes an upper coupler at its upper end to couple the non-fixed support connector with the machine ram, the coupler being rotatable in two orthogonal directions within a predetermined angular range.

13. The flexible electrochemical tool of claim 9, wherein
the sheet cathode elastically deforms to continually conform to a 3D surface contour of the workpiece such that the surface of the workpiece is traced as the workpiece is moved in relation to the sheet cathode, and
each support connector is arranged to vary its stroke to continually adapt to the elastic deformation of the sheet cathode while applying substantially a constant pressure regardless of changes in its stroke.

14. The flexible electrochemical tool of claim 9, wherein each support connector is arranged to actively vary its stroke based on a control signal so as to elastically deform the sheet cathode.

15. The flexible electrochemical tool of claim 9, wherein at least one support connector is a cylinder comprising a piston, a sliding bearing, and a spring.

16. The flexible electrochemical tool of claim 1, further comprising at least one sensor arranged to detect a surface height of the workpiece.

17. The flexible electrochemical tool of claim 9, further comprising at least one sensor arranged to detect a surface height of the workpiece.

18. The flexible electrochemical tool of claim 1, wherein
the strip cathode is arranged to be linear in a first direction when in an uncompressed state, and
the plurality of support connectors is arranged to be oriented in a second direction normal to the first direction when the strip cathode is in the uncompressed state.

19. The flexible electrochemical tool of claim 9, wherein
the sheet cathode is arranged to be in a plane defined by first
and third directions when in an uncompressed state, and
the plurality of support connectors is arranged to be oriented in a second direction normal to the plane of the sheet cathode when the sheet cathode is in the uncompressed state.

20. A flexible electrochemical tool for use in performing a flexible electrochemical process on a workpiece, the flexible electrochemical tool comprising:
a strip cathode elastically deformable in two dimensions (2D);
a machine ram; and
a plurality of support connectors connected with the machine ram at upper ends thereof and connected with the strip cathode at lower ends thereof along a length of the strip cathode, wherein
the plurality of support connectors includes at least one fixed support connector whose lateral position is fixed relative to the machine ram,
each support connector is arranged to vary in stroke as the strip cathode elastically deforms,
each support connector includes a rotating coupler arranged to couple the lower end of the support connector and arranged to turn as the strip cathode elastically deforms, and
the plurality of support connectors also includes at least one non-fixed support connector slidably coupled to the machine ram at its upper end via a sliding coupler to enable the non-fixed support connector to move laterally relative to the machine ram as the strip cathode elastically deforms such that the non-fixed support connector extends or contracts from the machine ram substantially vertically.

21. A flexible electrochemical tool for use in performing a flexible electrochemical process on a workpiece, the flexible electrochemical tool comprising:
a strip cathode elastically deformable in two dimensions (2D);
a machine ram; and
a plurality of support connectors connected with the machine ram at upper ends thereof and connected with the strip cathode at lower ends thereof along a length of the strip cathode, wherein
the plurality of support connectors includes at least one fixed support connector whose lateral position is fixed relative to the machine ram,
each support connector is arranged to vary in stroke as the strip cathode elastically deforms,
each support connector includes a rotating coupler arranged to couple the lower end of the support connector and arranged to turn as the strip cathode elastically deforms, and
at least one support connector is a cylinder comprising a sliding bearing, a spring, and a piston.

22. A flexible electrochemical tool for use in performing a flexible electrochemical process on a workpiece, the flexible electrochemical tool comprising:
a strip cathode elastically deformable in two dimensions (2D);
a machine ram; and
a plurality of support connectors connected with the machine ram at upper ends thereof and connected with the strip cathode at lower ends thereof along a length of the strip cathode, wherein the plurality of support connectors includes at least one fixed support connector whose lateral position is fixed relative to the machine ram,
each support connector is arranged to vary in stroke as the strip cathode elastically deforms,
each support connector includes a rotating coupler arranged to couple the lower end of the support connector and arranged to turn as the strip cathode elastically deforms,
the strip cathode is housed in a cathode structure, the cathode structure comprising:
a plurality of inlets arranged to provide an inflow of electrolyte;
a plurality of insulating spacers spaced apart from each other, the spaces in between the insulating spacers defining a plurality of outlets arranged to provide an outflow of the electrolyte;
one or more insulating standoffs arranged to guide the electrolyte to flow from the plurality of inlets to the plurality of outlets; and
an insulating coating applied to areas corresponding to the plurality of inlets and the plurality of outlets, and
the plurality of insulating spacers and the one or more insulating standoffs are at a predetermined thickness so as to provide an inter-electrode gap between the strip cathode and the workpiece.

23. A flexible electrochemical tool to perform a flexible electrochemical process on a workpiece, the flexible electrochemical tool comprising:
a sheet cathode arranged to elastically deform in three dimensions (3D);
a machine ram; and
a plurality of support connectors connected with the machine ram at upper ends thereof and connected with the sheet cathode at lower ends thereof along an upper surface of the sheet cathode, wherein
each support connector is arranged to vary in stroke as the sheet cathode elastically deforms,
each support connector includes a lower connector arranged to couple the lower end of the support connector with the sheet cathode as the sheet cathode elastically deforms,
the lower connector comprises:
a rotatable mechanism rotatable in two orthogonal directions; and
a pad connected to the rotatable mechanism and attached to the sheet cathode, and
the rotatable mechanism and the pad allow the support connector to adapt substantially normally to the workpiece surface contour.

24. A flexible electrochemical tool to perform a flexible electrochemical process on a workpiece, the flexible electrochemical tool comprising:
a sheet cathode arranged to elastically deform in three dimensions (3D);
a machine ram; and
a plurality of support connectors connected with the machine ram at upper ends thereof and connected with the sheet cathode at lower ends thereof along an upper surface of the sheet cathode, wherein
each support connector is arranged to vary in stroke as the sheet cathode elastically deforms,
each support connector includes a lower connector arranged to couple the lower end of the support connector with the sheet cathode as the sheet cathode elastically deforms, and at least one support connector is a cylinder comprising a piston, a sliding bearing, and a spring.

25. A flexible electrochemical tool for use in performing a flexible electrochemical process on a workpiece, the flexible electrochemical tool comprising:
a strip cathode elastically deformable in two dimensions (2D);
a machine ram; and
a plurality of support connectors connected with the machine ram at upper ends thereof and connected with the strip cathode at lower ends thereof along a length of the strip cathode, wherein
each support connector is arranged to vary in stroke such that a length of that support connector changes as the strip cathode elastically deforms, and
each support connector includes a rotating coupler arranged to couple the lower end of the support connector and arranged to turn as the strip cathode elastically deforms.

26. The flexible electrochemical tool of claim 25, wherein the plurality of support connectors includes at least one fixed support connector whose lateral position is fixed relative to the machine ram.

27. The flexible electrochemical tool of claim 25, wherein the plurality of support connectors also includes at least one non-fixed support connector slidably coupled to the machine ram at its upper end via a sliding coupler to enable the non-fixed support connector to move laterally relative to the machine ram as the strip cathode elastically deforms such that the non-fixed support connector extends or contracts from the machine ram substantially vertically.

28. The flexible electrochemical tool of claim 25, wherein the rotating couplers are lower rotating couplers, and
the plurality of support connectors includes at least one non-fixed support connector rotatably coupled to the machine ram at its upper end via an upper rotating coupler to enable the non-fixed support connector to rotate as the strip cathode elastically deforms.

29. The flexible electrochemical tool of claim 25, wherein the strip cathode elastically deforms to continually conform to a 2D surface contour of the workpiece such that the surface of the workpiece is traced as the workpiece is moved in relation to the strip cathode, and
each support connector is arranged to vary its stroke to continually adapt to the elastic deformation of the strip cathode while applying substantially a constant pressure regardless of changes in its stroke.

30. The flexible electrochemical tool of claim 25, wherein each support connector is arranged to actively vary its stroke based on a control signal so as to elastically deform the strip cathode.

31. The flexible electrochemical tool of claim 25, wherein at least one support connector is a cylinder comprising a sliding bearing, a spring, and a piston.

32. The flexible electrochemical tool of claim 25, wherein the strip cathode is housed in a cathode structure, the cathode structure comprising:
a plurality of inlets arranged to provide an inflow of electrolyte;
a plurality of insulating spacers spaced apart from each other, the spaces in between the insulating spacers defining a plurality of outlets arranged to provide an outflow of the electrolyte;
one or more insulating standoffs arranged to guide the electrolyte to flow from the plurality of inlets to the plurality of outlets; and
an insulating coating applied to areas corresponding to the plurality of inlets and the plurality of outlets, wherein
the plurality of insulating spacers and the one or more insulating standoffs are at a predetermined thickness so as to provide an inter-electrode gap between the strip cathode and the workpiece.

33. The flexible electrochemical tool of claim 25, wherein the strip cathode is formed of a sheet metal, the sheet metal cathode being elastically deformable in a vertical direction along different points of the cathode in a lateral direction.

34. The flexible electrochemical tool of claim 25, further comprising at least one sensor arranged to detect a surface height of the workpiece.

35. The flexible electrochemical tool of claim 25, wherein
the strip cathode is arranged to be linear in a first direction when in an uncompressed state, and
the plurality of support connectors is arranged to be oriented in a second direction normal to the first direction when the strip cathode is in the uncompressed state.

36. A flexible electrochemical tool to perform a flexible electrochemical process on a workpiece, the flexible electrochemical tool comprising:
a sheet cathode arranged to elastically deform in three dimensions (3D);
a machine ram; and
a plurality of support connectors connected with the machine ram at upper ends thereof and connected with the sheet cathode at lower ends thereof along an upper surface of the sheet cathode, wherein
the plurality of support connectors includes at least one fixed support connector whose lateral position is fixed relative to the machine ram via a fixed connection at its upper end, and
each support connector is arranged to vary in stroke such that a length of that support connector changes as the sheet cathode elastically deforms, and
each support connector includes a lower connector arranged to couple the lower end of the support connector with the sheet cathode as the sheet cathode elastically deforms.

37. The flexible electrochemical tool of claim 36, wherein the lower connector comprises:
a rotatable mechanism rotatable in two orthogonal directions; and
a pad connected to the rotatable mechanism and attached to the sheet cathode, wherein
the rotatable mechanism and the pad allow the support connector to adapt substantially normally to the workpiece surface contour.

38. The flexible electrochemical tool of claim 36, wherein each non-fixed support connector includes an upper coupler at its upper end to couple the non-fixed support connector with the machine ram, the coupler being rotatable in two orthogonal directions within a predetermined angular range.

39. The flexible electrochemical tool of claim 36, wherein
the sheet cathode elastically deforms to continually conform to a 3D surface contour of the workpiece such that the surface of the workpiece is traced as the workpiece is moved in relation to the sheet cathode, and
each support connector is arranged to vary its stroke to continually adapt to the elastic deformation of the sheet cathode while applying substantially a constant pressure regardless of changes in its stroke.

40. The flexible electrochemical tool of claim 36, wherein at least one support connector is a cylinder comprising a piston, a sliding bearing, and a spring.

41. The flexible electrochemical tool of claim 36, wherein the sheet cathode is arranged to be in a plane defined by first and third directions when in an uncompressed state, and the plurality of support connectors is arranged to be oriented in a second direction normal to the plane of the sheet cathode when the sheet cathode is in the uncompressed state.

* * * * *

UNITED STATES PATENT AND TRADEMARK OFFICE
CERTIFICATE OF CORRECTION

PATENT NO. : 8,597,489 B2  
APPLICATION NO. : 12/832693  
DATED : December 3, 2013  
INVENTOR(S) : Yuefeng Luo et al.

It is certified that error appears in the above-identified patent and that said Letters Patent is hereby corrected as shown below:

In the specifications:

At column 8, line 44, delete "mounting" before --machine ram--

In the claims:

At Claim 1, column 18, lines 57-59, delete the second instance of "for use in performing a flexible electrochemical process"

Signed and Sealed this  
First Day of April, 2014

Michelle K. Lee  
*Deputy Director of the United States Patent and Trademark Office*